(12) United States Patent
Benkley et al.

(10) Patent No.: US 8,165,355 B2
(45) Date of Patent: Apr. 24, 2012

(54) METHOD AND APPARATUS FOR FINGERPRINT MOTION TRACKING USING AN IN-LINE ARRAY FOR USE IN NAVIGATION APPLICATIONS

(75) Inventors: Fred George Benkley, Andover, MA (US); David Joseph Geoffroy, Amherst, MA (US)

(73) Assignee: Validity Sensors, Inc., San Jose, CA (US)

( * ) Notice: Subject to any disclaimer, the term of this patent is extended or adjusted under 35 U.S.C. 154(b) by 936 days.

(21) Appl. No.: 11/519,362

(22) Filed: Sep. 11, 2006

(65) Prior Publication Data

US 2008/0063245 A1 Mar. 13, 2008

(51) Int. Cl.
*G06K 9/00* (2006.01)
*G09G 5/00* (2006.01)
(52) U.S. Cl. ......................... 382/124; 345/156
(58) Field of Classification Search ............... 382/124
See application file for complete search history.

(56) References Cited

U.S. PATENT DOCUMENTS

| 4,151,512 A | 4/1979 | Rigannati et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |

(Continued)

FOREIGN PATENT DOCUMENTS

DE 2213813 A1 10/1973

(Continued)

OTHER PUBLICATIONS

Matsumoto et al., Impact of Artifical "Gummy" Fingers on Fingerprint Systesm, SPIE 4677 (2002), reprinted from cryptome.org.

(Continued)

*Primary Examiner* — David Zarka
(74) *Attorney, Agent, or Firm* — Greenberg Traurig LLP; Cecily Anne O'Regan; William C. Cray

(57) ABSTRACT

The invention provides an independent relative motion sensor for use in navigation operations using a fingerprint that do not require the power demanded by conventional devices. The independent relative motion sensor includes a linear array of sensing elements that captures a narrow string of data that is indicative of fingerprint features along a relatively narrow sample. This string of data is used to determine the velocity of travel for use in navigation operations. Using multiple sensors, motion and direction data can be computed and used to provide two-dimensional direction for navigating an object, such as a cursor on a monitor. The invention can be incorporated in an electronic device to provide improved navigation operations that demand less power.

14 Claims, 18 Drawing Sheets

U.S. PATENT DOCUMENTS

| | | | |
|---|---|---|---|
| 5,422,807 A | 6/1995 | Mitra et al. | |
| 5,543,591 A | 8/1996 | Gillespie et al. | |
| 5,569,901 A | 10/1996 | Bridgelall et al. | |
| 5,623,552 A | 4/1997 | Lane | |
| 5,627,316 A | 5/1997 | De Winter et al. | |
| 5,650,842 A | 7/1997 | Maase et al. | |
| 5,717,777 A | 2/1998 | Wong et al. | |
| 5,781,651 A | 7/1998 | Hsiao et al. | |
| 5,801,681 A | 9/1998 | Sayag | |
| 5,818,956 A | 10/1998 | Tuli | |
| 5,838,306 A | 11/1998 | O'Connor | |
| 5,852,670 A | 12/1998 | Setlak et al. | |
| 5,864,296 A * | 1/1999 | Upton | 340/5.53 |
| 5,887,343 A | 3/1999 | Salatino et al. | |
| 5,892,824 A | 4/1999 | Beatson et al. | |
| 5,903,225 A | 5/1999 | Schmitt et al. | |
| 5,915,757 A | 6/1999 | Tsuyama et al. | |
| 5,920,384 A | 7/1999 | Borza | |
| 5,920,640 A | 7/1999 | Salatino et al. | |
| 5,940,526 A | 8/1999 | Setlak et al. | |
| 5,999,637 A | 12/1999 | Toyoda et al. | |
| 6,002,815 A | 12/1999 | Immega et al. | |
| 6,016,355 A | 1/2000 | Dickinson et al. | |
| 6,052,475 A | 4/2000 | Upton | |
| 6,067,368 A | 5/2000 | Setlak et al. | |
| 6,073,343 A | 6/2000 | Petrick et al. | |
| 6,076,566 A | 6/2000 | Lowe | |
| 6,088,585 A | 7/2000 | Schmitt et al. | |
| 6,098,175 A | 8/2000 | Lee | |
| 6,134,340 A | 10/2000 | Hsu et al. | |
| 6,157,722 A | 12/2000 | Lerner et al. | |
| 6,161,213 A | 12/2000 | Lofstrom | |
| 6,182,076 B1 | 1/2001 | Yu et al. | |
| 6,182,892 B1 | 2/2001 | Angelo et al. | |
| 6,185,318 B1 | 2/2001 | Jain et al. | |
| 6,259,108 B1 | 7/2001 | Antonelli et al. | |
| 6,289,114 B1 | 9/2001 | Mainguet | |
| 6,317,508 B1 | 11/2001 | Kramer et al. | |
| 6,320,394 B1 | 11/2001 | Tartagni | |
| 6,332,193 B1 | 12/2001 | Glass et al. | |
| 6,333,989 B1 * | 12/2001 | Borza | 382/124 |
| 6,337,919 B1 | 1/2002 | Dunton | |
| 6,346,739 B1 | 2/2002 | Lepert et al. | |
| 6,347,040 B1 | 2/2002 | Fries et al. | |
| 6,362,633 B1 | 3/2002 | Tartagni | |
| 6,392,636 B1 * | 5/2002 | Ferrari et al. | 345/173 |
| 6,400,836 B2 | 6/2002 | Senior | |
| 6,408,087 B1 * | 6/2002 | Kramer | 382/124 |
| 6,473,072 B1 | 10/2002 | Comiskey et al. | |
| 6,509,501 B2 | 1/2003 | Eicken et al. | |
| 6,539,101 B1 | 3/2003 | Black | |
| 6,580,816 B2 | 6/2003 | Kramer et al. | |
| 6,597,289 B2 | 7/2003 | Sabatini | |
| 6,643,389 B1 * | 11/2003 | Raynal et al. | 382/124 |
| 6,672,174 B2 | 1/2004 | Deconde et al. | |
| 6,738,050 B2 | 5/2004 | Comiskey et al. | |
| 6,741,729 B2 | 5/2004 | Bjorn et al. | |
| 6,757,002 B1 | 6/2004 | Oross et al. | |
| 6,766,040 B1 | 7/2004 | Catalano et al. | |
| 6,785,407 B1 | 8/2004 | Tschudi et al. | |
| 6,838,905 B1 | 1/2005 | Doyle | |
| 6,886,104 B1 | 4/2005 | McClurg et al. | |
| 6,897,002 B2 | 5/2005 | Teraoka et al. | |
| 6,898,299 B1 | 5/2005 | Brooks | |
| 6,937,748 B1 | 8/2005 | Schneider et al. | |
| 6,941,001 B1 | 9/2005 | Bolle et al. | |
| 6,941,810 B2 | 9/2005 | Okada | |
| 6,950,540 B2 * | 9/2005 | Higuchi | 382/124 |
| 6,959,874 B2 | 11/2005 | Bardwell | |
| 6,963,626 B1 | 11/2005 | Shaeffer et al. | |
| 6,970,584 B2 | 11/2005 | O'Gorman et al. | |
| 6,980,672 B2 | 12/2005 | Saito et al. | |
| 6,983,882 B2 | 1/2006 | Cassone | |
| 7,020,591 B1 | 3/2006 | Wei et al. | |
| 7,030,860 B1 | 4/2006 | Hsu et al. | |
| 7,042,535 B2 | 5/2006 | Katoh et al. | |
| 7,043,644 B2 | 5/2006 | DeBruine | |
| 7,046,230 B2 * | 5/2006 | Zadesky et al. | 345/156 |
| 7,064,743 B2 | 6/2006 | Nishikawa | |
| 7,099,496 B2 * | 8/2006 | Benkley, III | 382/124 |
| 7,110,577 B1 * | 9/2006 | Tschudi | 382/124 |
| 7,126,389 B1 | 10/2006 | McRae et al. | |
| 7,129,926 B2 * | 10/2006 | Mathiassen et al. | 345/157 |
| 7,136,514 B1 | 11/2006 | Wong | |
| 7,146,024 B2 | 12/2006 | Benkley | |
| 7,146,026 B2 | 12/2006 | Russo et al. | |
| 7,146,029 B2 | 12/2006 | Manansala | |
| 7,194,392 B2 | 3/2007 | Tuken et al. | |
| 7,197,168 B2 | 3/2007 | Russo | |
| 7,200,250 B2 | 4/2007 | Chou | |
| 7,251,351 B2 | 7/2007 | Mathiassen et al. | |
| 7,258,279 B2 | 8/2007 | Schneider et al. | |
| 7,290,323 B2 | 11/2007 | Deconde et al. | |
| 7,308,122 B2 | 12/2007 | McClurg et al. | |
| 7,321,672 B2 | 1/2008 | Sasaki et al. | |
| 7,360,688 B1 | 4/2008 | Harris | |
| 7,379,569 B2 | 5/2008 | Chikazawa et al. | |
| 7,409,876 B2 | 8/2008 | Ganapathi et al. | |
| 7,412,083 B2 | 8/2008 | Takahashi | |
| 7,424,618 B2 | 9/2008 | Roy et al. | |
| 7,447,911 B2 | 11/2008 | Chou et al. | |
| 7,460,697 B2 | 12/2008 | Erhart et al. | |
| 7,463,756 B2 | 12/2008 | Benkley | |
| 7,505,611 B2 | 3/2009 | Fyke | |
| 7,505,613 B2 | 3/2009 | Russo | |
| 7,574,022 B2 | 8/2009 | Russo | |
| 7,643,950 B1 | 1/2010 | Getzin et al. | |
| 7,646,897 B2 | 1/2010 | Fyke | |
| 7,681,232 B2 | 3/2010 | Nordentoft et al. | |
| 7,751,601 B2 | 7/2010 | Benkley | |
| 7,843,438 B2 | 11/2010 | Onoda | |
| 7,953,258 B2 | 5/2011 | Dean et al. | |
| 2001/0026636 A1 | 10/2001 | Mainget | |
| 2001/0030644 A1 | 10/2001 | Allport | |
| 2001/0036299 A1 | 11/2001 | Senior | |
| 2001/0043728 A1 | 11/2001 | Kramer et al. | |
| 2002/0025062 A1 | 2/2002 | Black | |
| 2002/0067845 A1 * | 6/2002 | Griffis | 382/107 |
| 2002/0073046 A1 | 6/2002 | David | |
| 2002/0089410 A1 | 7/2002 | Janiak et al. | |
| 2002/0122026 A1 | 9/2002 | Bergstrom | |
| 2002/0126516 A1 | 9/2002 | Jeon | |
| 2002/0133725 A1 | 9/2002 | Roy et al. | |
| 2002/0181749 A1 | 12/2002 | Matsumoto et al. | |
| 2003/0002717 A1 | 1/2003 | Hamid | |
| 2003/0002719 A1 | 1/2003 | Hamid et al. | |
| 2003/0021495 A1 | 1/2003 | Cheng | |
| 2003/0035570 A1 | 2/2003 | Benkley | |
| 2003/0068072 A1 | 4/2003 | Hamid | |
| 2003/0076301 A1 * | 4/2003 | Tsuk et al. | 345/159 |
| 2003/0076303 A1 * | 4/2003 | Huppi | 345/163 |
| 2003/0095096 A1 * | 5/2003 | Robbin et al. | 345/156 |
| 2003/0102874 A1 | 6/2003 | Lane et al. | |
| 2003/0123714 A1 * | 7/2003 | O'Gorman et al. | 382/124 |
| 2003/0141959 A1 | 7/2003 | Keogh et al. | |
| 2003/0147015 A1 | 8/2003 | Katoh et al. | |
| 2003/0161510 A1 | 8/2003 | Fujii | |
| 2003/0161512 A1 | 8/2003 | Mathiassen et al. | |
| 2003/0169228 A1 * | 9/2003 | Mathiassen et al. | 345/156 |
| 2003/0174871 A1 | 9/2003 | Yoshioka et al. | |
| 2003/0186157 A1 | 10/2003 | Teraoka et al. | |
| 2003/0209293 A1 | 11/2003 | Sako et al. | |
| 2003/0224553 A1 | 12/2003 | Manansala | |
| 2004/0012773 A1 | 1/2004 | Puttkammer | |
| 2004/0022001 A1 | 2/2004 | Chu et al. | |
| 2004/0050930 A1 | 3/2004 | Rowe | |
| 2004/0066613 A1 | 4/2004 | Leitao | |
| 2004/0076313 A1 | 4/2004 | Bronstein et al. | |
| 2004/0081339 A1 | 4/2004 | Benkley | |
| 2004/0096086 A1 | 5/2004 | Miyasaka | |
| 2004/0113956 A1 | 6/2004 | Bellwood et al. | |
| 2004/0120400 A1 | 6/2004 | Linzer | |
| 2004/0125993 A1 | 7/2004 | Zhao et al. | |
| 2004/0129787 A1 | 7/2004 | Saito | |
| 2004/0136612 A1 | 7/2004 | Meister et al. | |
| 2004/0172339 A1 | 9/2004 | Snelgrove et al. | |
| 2004/0179718 A1 | 9/2004 | Chou | |

| | | |
|---|---|---|
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1* | 10/2004 | Tschudi ................. 382/124 |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0267462 A1 | 10/2008 | Nelson et al. |
| 2008/0279373 A1 | 11/2008 | Erhart et al. |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0119124 A1 | 5/2010 | Satyan |
| 2010/0123657 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0102567 A1 | 5/2011 | Erhart |
| 2011/0102569 A1 | 5/2011 | Erhart |

FOREIGN PATENT DOCUMENTS

| | | |
|---|---|---|
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| JP | 04158434 A2 | 6/1992 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extra1/afstvers1/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

* cited by examiner

METHOD AND APPARATUS FOR FINGERPRINT MOTION TRACKING USING AN IN-LINE ARRAY FOR USE IN NAVIGATION APPLICATIONS

BACKGROUND

The invention relates generally to technology for sensing and recording fingerprints and, more particularly to systems, devices and methods for fingerprint motion tracking alone and in combination with fingerprint image processing and navigation operations.

A number of devices and techniques exist for sensing, capturing, and reconstructing the image of a fingerprint as it moves across a sensor array. Though many devices exist to sense and record an entire fingerprint, partial fingerprint sensing devices have been developed for small portable devices to save space. The sensing devices themselves vary widely, and many devices and related techniques exist for sensitively detecting the presence of the finger surface and features located on the surface that make up the unique fingerprint of a person. For example, one common configuration used for a fingerprint sensing surface includes CCD (charge coupled devices) or C-MOS circuits. These components are embedded in a sensing surface to form a matrix of piezoelectric elements that generate signals in response to pressure applied to the surface by a finger. These signals are read by a processor and used to reconstruct the fingerprint of a user and to verify identification. Other devices include a matrix of optical sensors that read light reflected off of a person's finger and onto optical elements The reflected light is converted to a signal that defines the fingerprint of the finger analyzed and is used to reconstruct the fingerprint and to verify identification. More modern devices include static or radio frequency (RF) devices configured to measure the intensity of electric fields conducted by finger ridges and valleys to sense and capture the fingerprint image. Regardless of the method used to sense the fingerprint, conventional devices and techniques have common drawbacks, particularly when used in combination with portable electronic devices. These devices require small component size because of a lack of space and surface area due to the devices small size, and further require that any power demand be as small as possible due to limited battery life.

Specifically, devices exist that have a sensing area that is smaller than the fingerprint area to be imaged. Such devices are greatly desired because they take up much less space than a full fingerprint sensor. This is a very useful feature for small portable devices. These sensing devices generally consist of one or more imaging lines disposed perpendicular to the axis of motion. As the finger surface is moved across the sensor, portions of the fingerprint are sensed and captured by the device. These portions are subsequently reconstructed in a mosaic or overlapping manner. In operation however, current conventional devices have severe drawbacks. They generally require extensive processing resources for computing the algorithms and required data for reconstructing fingerprints.

For applications of fingerprint identification devices in portable electronics, such as laptops and cellular telephones, low power consumption is a strict requirement. Therefore, it is important to maintain minimal computation processing in such applications. Again, present conventional fingerprint sensor technology requires a substantial amount of processing, and thus requires a large amount of power to perform the required tasks for reconstructing fingerprints for identification. One major problem is that a large amount of pixel information is required to be recorded and matched in a short amount of time, burdening the device processor and consuming substantial power. This is a big problem with small devices, which already have restrictions on power consumption.

One conventional device is described in U.S. Pat. No. 6,002,815 of Immega, et al. The technique used by the Immega device is based on the amount of time required for the finger to travel a fixed distance between two parallel image lines that are oriented perpendicular to the axis of motion. After a time history of samples are captured, the speed is determined by finding the time delay that provides the best match between data from the first line and data to from the second line. The device captures the entire image of an object and stores the image line by line. Such an object is illustrated as a photo copy of a document, and the reference does not suggest a fingerprint or other image. Thus, it is directed to a device and method for scanning an image passing over a perpendicular slit pair at a variable speed, as opposed to objects that pass over the slit pair at a fixed speed. It does not address the problem of excessive processor power expended to perform the process. Also, the perpendicular lines of the image are used for determining the speed of the object as it passes through the perpendicular slit where the image is captured. These recorded lines are also used in reconstructing the image when the scan is complete. Thus, a large amount of data is processed and stored in the process. The amount of processing resources required to calculate the speed at any given moment is immense, where the resources include time required, calculation by the processor and power demanded by the processor. Furthermore, this time series approach has the disadvantage that it is not possible to quickly determine an absolute distance of motion by comparing only the instantaneous data from the two image lines. This is true for all cases other than for the rare coincidental case where the finger happens to travel exactly the distance between the image lines during the interval between the two samples. Another problem arises when the object is moving much slower than the sample rate of the device. In this case, the number of samples needed to find a match is substantial. In addition, at slow speeds, the device must compare a larger number of stored lines in order to find a match. This greatly increases the computational requirements, placing a substantial burden on the device processor. Thus, expensive high order processors are required for adequate performance and substantial power is needed to operate such processors.

Another technique is described in U.S. Pat. No. 6,289,114 of Mainguet. A device utilizing this method reconstructs fingerprints based on sensing and recording images taken of rectangular slices of the fingerprint and piecing them together using an overlapping mosaic algorithm. Like Immega, the technique described in Mainguet is also computationally burdensome on the device processor. Furthermore, the Mainguet method requires a substantial amount of memory as well as a larger number of imaging pixels in order to properly record the images. Again, this method demands substantial power to perform algorithms, a big problem for power rationed portable devices.

For accurate fingerprint capture, it is often advantageous to provide a navigation function with the same device used for fingerprint sensing. The navigation function can provide more functionality in as little area as possible in a portable device, and provide a more accurate fingerprint image. However, conventional devices and methods for navigation require substantial processor resources, and thus demand more power. In such devices, in order to sense finger motion, the sensing device must sample the image at a periodic rate that is fast enough to ensure that a moving feature will be sampled when it passes both the primary imaging line and the auxiliary line of pixels. As a consequence, the sensor needs to operate at full imaging speeds, thus consuming full imaging power while in the navigation mode. Consequently, conventional navigation methods demand substantial power, and are thus impractical for small devices.

Thus, there exists a great need in the art for a more efficient means to accurately sense and capture fingerprints on portable devices and also to provide navigation operations without unduly demanding power. As will be seen, the invention provides a means to overcome the shortcomings of conventional systems in an elegant manner.

DETAILED DESCRIPTION

Figure 1A:
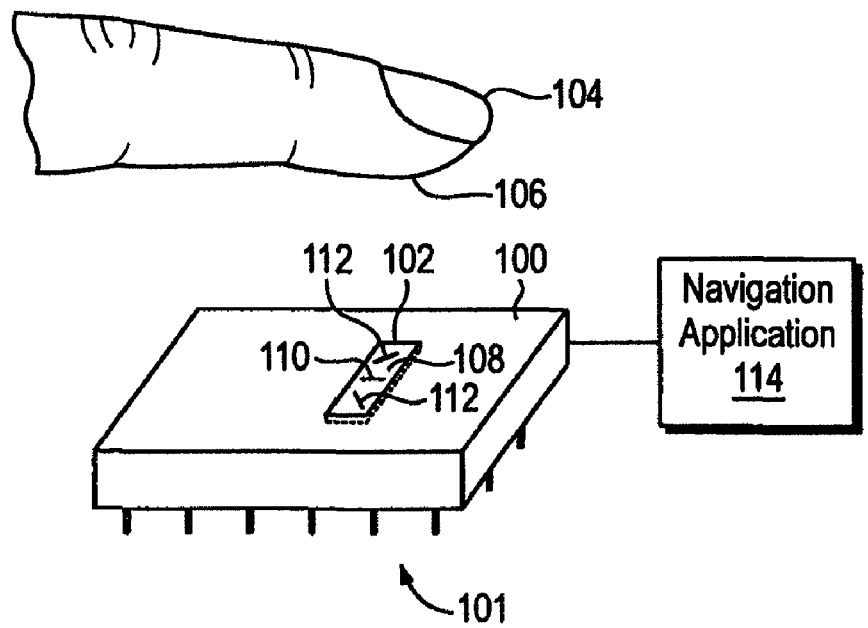
FIG. 1A is a diagrammatic view of a sensor configured according to the invention.

The invention provides an independent relative motion sensor for use in navigation operations using a fingerprint that do not require the power demanded by conventional devices. The independent relative motion sensor includes a linear array of sensing elements that captures a narrow string of data that is indicative of fingerprint features along a relatively narrow sample. This string of data is used to determine the velocity of travel for use in navigation operations. Using multiple sensors, motion and direction data can be computed and used to provide two-dimensional direction for navigating an object, such as a cursor on a monitor. The invention can be incorporated in an electronic device to provide improved navigation operations that demand less power.

In operation, the linear sensor array senses and captures fingerprint features in the form of a string of data signals by first sensing the features in an initial sensing and capture, and this is followed by one or more subsequent operations where a sample is taken of a subset of the fingerprint features are captured again over a known time period. This time period may be predetermined or measured as time progresses between sensing and capturing of the samples. Once at least two samples are taken, a subsequent sample is compared against a previous sample to determine the amount shift of the previous sample relative to the subsequent sample. In one embodiment, a single linear line of sensor pixels is used to sense a one-dimensional track of fingerprint features, and the signal sensed by the pixels is converted from an analog signal to a digital signal, where the features are then represented as a string of digital values. For example, the ridges of the fingerprint features may be represented as logical ones, and valleys represented as logical zeros.

When compared, the first string of digital values from one sample can be compared to the second string in a one to one relationship, and a similarity score can be produced that measures the number of matching values. If there is an immediate match, where both strings are substantially identical, then this would indicate that there was no movement during the time between which the two samples were taken. If there is not an immediate match, then this would indicate that there was some movement, and additional comparisons may be needed to determine the distance traveled. For each comparison, the strings of digital values can be shifted one or more pixels at a time. Once a good match is found, the distance traveled by the fingerprint is simply the number of pixels shifted times the distance between the pixels, which may be measured from the center point of one pixel to the center point of another pixel in the array of pixel sensors for example.

In one embodiment, a predetermined number of comparisons can be made along with corresponding similarity scores. The process may then choose the highest score to determine the most accurate comparison. The number of pixels that were shifted to get the best comparison can then be used to determine the distance traveled, since the size of and distance between the pixels can be predetermined, and the number of pixels can thus be used to measure the distance traveled by the fingerprint across the motion sensor over the time period of the motion.

In another embodiment, the process could make comparisons and generate scores to measure against a predetermined threshold, rather than making a predetermined number of comparisons. In this embodiment, the similarity score from each comparison can be measured after the comparison is made. If the score is within the threshold, then it can be used to indicate the amount of shift from one sample to another. This can then be used to determine the distance traveled by the fingerprint across the linear motion sensor.

In one embodiment, generally, the invention provides a fingerprint motion tracking system and method, where a single linear sensor array is configured to sense features of a fingerprint along an axis of finger motion. The linear sensor array includes a plurality of substantially contiguous sensing elements or pixels configured to capture a segment of image data that represents a series of fingerprint features passing over a sensor surface. A buffer is configured to receive and store image data from the linear sensor array. And, a processing element is configured to generate fingerprint motion data. The linear sensor array may be configured to repeatedly sense at least two substantially contiguous segments of fingerprint data, and the processor can generate motion data based on at least two sensed contiguous segments of fingerprint data. In operation, the linear sensor array is configured to sense a first set of features of a fingerprint along an axis of finger motion and to generate a first set of image data captured by a plurality of substantially contiguous pixels of the sensor array. The linear sensor array is also configured to subsequently sense a second set of features of the fingerprint along an axis of finger motion and to generate a second set of image data captured by a plurality of substantially contiguous pixels of the sensor array. The processing element can then compare first and second sets of image data to determine the distance traveled by the fingerprint over a time interval.

As used herein, linear sensor array is a generic term that relates to a portion of sensing elements, whether they are pixels in an optical reader, a static or radio frequency reader that reads electric field intensity to capture a fingerprint image, piezoelectric components in touch-sensitive circuit fingerprint readers, or other elements indicative of fingerprint readers, where the elements are used to sense a portion of the fingerprint, rather than the entire fingerprint. Such sensor arrays may be configured in a number of ways within a matrix of well known sensor devices. For example, several modern configurations are described and illustrated in pending U.S. Patent Publication US 2006/0083411 entitled: Fingerprint Sensing Assemblies and Methods of Making; U.S. Patent Publication US 2005/0244039 entitled: Methods and Apparatus for Acquiring a Swiped Fingerprint Image; U.S. Patent Publication US 2005/0244038, entitled: Fingerprint Sensing Methods and Apparatus; U.S. Patent Publication US 2005/0035570 entitled: Swiped aperture capacitive fingerprint sensing systems and methods (U.S. Pat. No. 7,099,496), and other applications that are all assigned to common assignee Validity, Inc. Also, many other types of sensor matrices exist in the art directed to capturing fingerprint images. The invention is directed to a novel system, device and method that is not limited in application to any particular sensor matrix or array configuration. In fact, the invention can be used in conjunction with or incorporated into such configurations to improve performance, and further to reduce the processing resources required to capture and reconstruct images.

According to the invention, the linear sensor is substantially contiguous, which is to say that the sensor elements are in a relative proximity to each other so that a first reading of a portion of fingerprint features can be taken, followed by a second reading after a short period of time from another position. The two samples can be compared to determine the relative distance traveled by the fingerprint surface in relation to the sensor surface. The linear sensor is configured to merely take a relatively small sample of the fingerprint at one point in time, then another at a subsequent time. These two samples are used to determine movement of the fingerprint. Two or more samples maybe compared in order to compute direction and velocity of a fingerprint surface relative to the linear sensing elements. These samples may be linear, as described below and illustrated in the drawings, so that a linear array of fingerprint features can be recorded and easily compared to provide a basis for motion, distance traveled over time. If more than one sensor is employed, it is possible to determine direction of motion using vector addition with the different linear samples taken. Thus, some of the functions provided by the invention are a result of taking a linear sample to give a basis for vector analysis. However, those skilled in the art will understand that, given the description below and the related drawings, other embodiments are possible using other configurations of motion sensors, which would not depart from the spirit and scope of the invention, which is defined by the appended claims and their equivalents, as well as any claims and amendments presented in the future and their equivalents.

One useful feature of the invention is that ambiguity in results is substantially prevented. If properly configured, a system configured according to the invention can consistently produce a result, where at least two samples can be taken such that the features of one sample overlap with another sample. Then, comparisons can be made to determine the amount of shift, indicating the amount of movement of the fingerprint across the linear sensor. In prior art systems and methods, it is often the case that no result occurs, and a singularity results. Thus, a user would need to repeat sensing the fingerprint. In some systems, substantial predictor algorithms have been created in an attempt to compensate or resolve the singularity when it occurs. Such applications are very large and demand a good deal of computation and processing resources, which would greatly bog down a portable device. According to the invention, sensing motion of a fingerprint is substantially certain, where samples taken from the fingerprint surface are consistently reliable. This is particularly important in navigation applications, where relative movement of the finger translates to movement of an object such as a cursor on a graphical user interface (GUI), discussed further below.

In one embodiment, the linear sensor array may be used alone to determine linear movement of a fingerprint. In another embodiment, the single sensor array may be used in conjunction with one or more other linear sensor arrays to determine movement in two dimensions. In either embodiment, the linear sensor arrays are utilized solely for determining motion. If the motion of the analyzed fingerprint occurs generally along a predetermined axis of motion, the single linear sensor array can be utilized to sense the velocity of the fingerprint being analyzed. To capture and record the motion of a fingerprint that is not directed along a predetermined axis of motion, two or more linear arrays (a plurality of arrays) can be used together to sense and record such motion, and a processor can determine the direction and speed of the fingerprint using vector arithmetic.

In yet another embodiment, one or more such linear arrays may be used in conjunction with a fingerprint sensor matrix to more accurately capture and reconstruct a fingerprint image. The sensor matrix can be configured to sense and capture an image of a portion of a fingerprint being analyzed, and the one or more linear arrays can provide motion information for use in reconstructing a fingerprint image. A device so configured would be able to more accurately sense, capture, record and reconstruct a fingerprint image using less processing resources than conventional devices and methods.

The primary distinction between the invention and the prior art, Immega and Mainguet for example, is that the invention separates the analysis of motion from the capturing of the entire fingerprint image. The concept described in Immega, for example, requires the entire image to be captured and recoded line by line. The lines are used to both determine speed of the object being sensed and recorded and also calculate the speed of the object as it is passed over the perpendicular slot. Immega requires immense processing and storage resources to sense, capture, record and reconstruct the image, and all of these functions are carried out by processing the entire lot of image data captured and recorded. Similarly, a device configured according to Mainguet must capture large portions of the fingerprint image and requires substantial processing and storage resources to overlap and match the image mosaics to reconstruct the image. In stark contrast, the invention provides a means for detecting motion of a fingerprint separately from the process of capturing a fingerprint image, and uses the motion information to more efficiently reconstruct the fingerprint image using less processing and storage resources. The invention further provides a means for generating navigation information using the same mechanism.

Alternatively, in yet another embodiment, one or more arrays can be used to generate motion information for use in accurate navigational operations, such as for use in navigating a cursor on a graphical user interface (GUI). Utilizing the improved processing functions of the invention, an improved navigation device can be constructed that is compatible with a portable device that has the power and processing restrictions discussed above. Examples of such embodiments are described and illustrated below.

A motion sensor configured according to the invention uses substantially less space and power compared to conventional configurations for motion sensing, navigation and fingerprint image reconstruction. Such a configuration can further provide aid to conventional fingerprint reconstructing processes by better sensing motion of a finger while it is being analyzed by a sensing device. This allows a fingerprint sensing device the ability to reconstruct a fingerprint analyzed by a fingerprint sensor with reduced power. Utilizing the invention, conventional processes that need to match and construct fragmented images of a fingerprint, particularly devices that sense and process a fingerprint in portions, can be optimized with information related to fingerprint motion that occurs while a fingerprint surface is being read. Also, using this unique motion detection technology, optimal navigation functions can be provided that demand significantly less power than conventional devices. Such navigation functions can enable a low power navigation device to be integrated in a portable device system, such as a mouse pad used to move a cursor across a graphical user interface (GUII) on portable electronic devices including cellular phones, laptop computers, personal data assistants (PDAs), and other devices where low power navigation functions are desired. A novel system and method are provided that uses minimal space and processing resources in providing accurate motion detection from which fingerprint sensors as well as navigation systems can greatly benefit.

A device or system configured according to the invention can be implemented as a stand alone navigation device, or a device to provide image reconstruction information for use with a line imaging device that matches and assembles a fingerprint image. Such a line imaging device may be any imaging device configured to sense and capture portions of a fingerprint, whether it captures individual perpendicular image lines of a fingerprint, or multiple perpendicular lines.

In operation, a motion detection device can operate as a separate motion detection and/or direction detection device. Alternatively, a motion detection device can be used in conjunction with a line imaging device to more accurately and efficiently sense, capture, store and reconstruct a fingerprint image. A device configured according to the invention may include a single array of finger ridge sensing pixels or data sensor points centrally located along the principal axis of motion to be detected, a sampling system to periodically sample the finger contact across the array, and a computational module or element that compares two sets of samples collected at different times to determine the distance traveled while between the two sample times. According to the invention, the motion sensor pixels do not necessarily need to have the same resolution as the line imager. The motion sensor pixels may in fact use a different sensing technique than the imager.

Again, the invention provides separate operations for detecting motion and for sensing and capturing a fingerprint image. Thus, the techniques used for the separate processes can be the same or may be different depending on the application. Those skilled in the art will understand that different variations of the separate processes are possible using known techniques and techniques can be derived without any undue experimentation. Such variations would not depart from the spirit and scope of the invention.

In another embodiment, the invention provides the capability of multi-axis motion sensing with additional off-axis sensing arrays. In this embodiment, there are two or more (a plurality of) sensor arrays for detecting motion, and each axis is independently measured to determine the component of velocity in that axis. The velocity components from the individual axes are used to compute a vector sum to determine the actual direction and velocity of motion of the finger with respect to the sensor surface. According to the invention, it is not necessary to capture the full image of the fingerprint in order to determine the distance traveled and the velocity. It is only necessary to capture a linear sample of fingerprint features along the line of motion of the fingerprint. In one embodiment, a plurality of samples, such as two or three samples, are captured by motion sensor pixels and are used to determine the distance traveled across the axis of motion of the fingerprint relative to the sensor surface and the velocity at which the motion occurs. This information can also be used in navigational operations, and can further be used in combination with a fingerprint imager to aid in reconstructing a fingerprint image. Utilizing the invention, either application can be configured in an economical and useful manner. Moreover, the operation of such a sensor or navigational device can be optimized to consume substantially less power than conventional devices, which require excessive processor operations for reassembly of the fingerprint image. And, given the motion information generated by a system configured according to the invention, the distance traveled and velocity of the fingerprint can be used to more accurately and efficiently reconstruct a full fingerprint or to better represent relative motion information for use in navigation.

Aligning the pixels along the axis of motion, rather than perpendicular to it, enables the use of motion detection algorithms that can be both time-variant and distance variant. This enables development of algorithms that utilize short distance measurement over long time periods for low speed motion and longer distance motion to more accurately measure higher speed motion, thus optimizing response time and accuracy. Both embodiments share the advantages gained by acquiring and comparing multiple spatial measurements of the fingerprint pattern at each sampling instance. Because multiple samples are taken and compared simultaneously, effects of sampling error, both due to noise and imprecision in the sampling of the finger pattern, are minimized. Also, because samples are taken at multiple locations along the axis of motion simultaneously at each sampling period, the images from two sampling periods can be compared to detect if there had been any significant finger motion between the two sample times. One shared advantage is that both systems are capable of detecting under-sampling of the image being acquired by the line imager, as a consequence of their ability to detect motion of multiple pixels in a short time interval.

An embodiment using a single segmented motion sensor array offers the advantage of detecting motion over a shorter range of distance. This provides faster response time, particularly at low finger speeds that may be encountered in navigation applications. Because this embodiment is sensitive to single pixel motion, it provides unique features that may also reduce the memory requirements for the computational elements. In order to provide a navigation device, as well as to detect and correct for finger motion that is not completely aligned with the desired axis, either of the embodiments may be combined in ensembles such that one sensor is aligned on the axis of motion, and additional sensors aligned at an angle (such as 22.5 or 30 degrees) to the principal axis of finger motion. Examples of different embodiments are discussed below.

Referring to FIG. 1A, a diagrammatic view of motion detection and tracking system configured according to the invention is illustrated. An integrated circuit package 100 is illustrated having circuits and possibly software embedded (not shown) and electrical connections 101 for integration in and connection with a system that utilizes the circuit package. FIG. 1 illustrates an embodiment of the invention where a finger 104 can move its fingerprint surface 106 against sensor surface 108 to be read by the sensors 110, 112. These sensors can pick up movement information of a fingerprint for use in navigational applications, or can be used in conjunction with an integrated fingerprint sensor surface 108 to simultaneously capture and record portions of a fingerprint. Such a system configured according to the invention may be a stand alone component as shown, or can be integrated with other circuits for more space and power savings as well as efficiency. Those skilled in the art will understand that many variations of the configuration are possible, and that the invention is not limited to any particular configuration, but is defined by the claims and all equivalents.

The system further includes a sensor module 102 that is used to sense a user's finger 104 fingerprint surface 106 when it is moved across fingerprint sensing surface 108. As can be seen, the fingerprint sensing surface 108 is illustrated as a narrow surface that is designed to sense and capture portions of a fingerprint as it is moves across the sensor. These portions can be subsequently reconstructed according to the invention using motion information from the motion sensors 110,112. Thus, the sensor components illustrated in FIG. 1 have multiple utilities, and can be configured in devices that utilize part or all of such utilities, whether it is a stand alone motion sensor configured to sense movement and velocity in one direction, a multidirectional motion sensor configured to sense movement and velocity in several directions, or a combination device configured to sense motion either in one or more (one or more meaning a plurality of directions) directions and used in combination with a fingerprint sensor surface that reads portions of fingerprints and reassembles the fingerprints using the motion information from motion sensors. The features and benefits of several embodiments of the invention are discussed and illustrated below. Again, these are intended as mere examples of different embodiments, and are not intended as an exhaustive set of samples. And again, those skilled in the art will understand that these and other embodiments of the invention described herein are illustrative of the invention and are not intended to limit the spirit and scope of the invention, which is defined by the appended claims and all equivalents, including claims appended herein upon filing and also those as possibly amended at a later date.

Figure 1B:
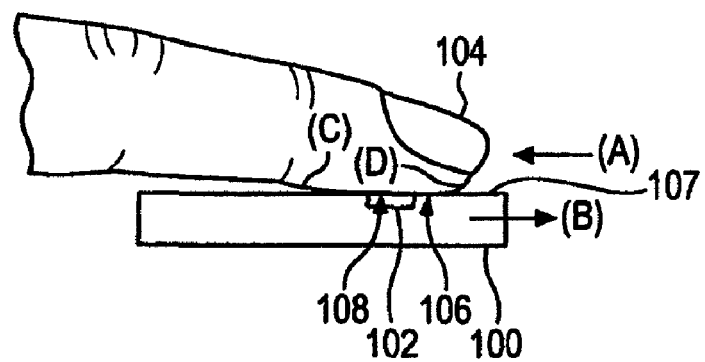
FIG. 1B is a diagrammatic view of a sensor configured according to the invention.

Referring to FIG. 1B, a side view of the sensor system of FIG. 1A is illustrated. In operation, the finger 104 is placed by a user onto the sensor surface 107, which includes fingerprint sensing surface 108, so that the fingerprint sensing surface 108 and the sensor surface 106 are juxtaposed relative to each other. The finger 104 and sensor 100 moves in opposite directions A, B, so that the sensor 102 can move across and analyze the fingerprint surface 106. In different applications and devices, this interaction may take on many forms. A user may hold the fingerprint surface stationary so that sensor 102 can move relative to the fingerprint, similar to the operations of a photocopy machine. Or, if the sensor is fixed in a surface, such as on the surface of a laptop computer or cellular phone, the user can move the fingerprint surface 106 by rubbing it against and along the fingerprint sensing surface 108 so that the sensor 102 can analyze and read the fingerprint.

Figure 2A:
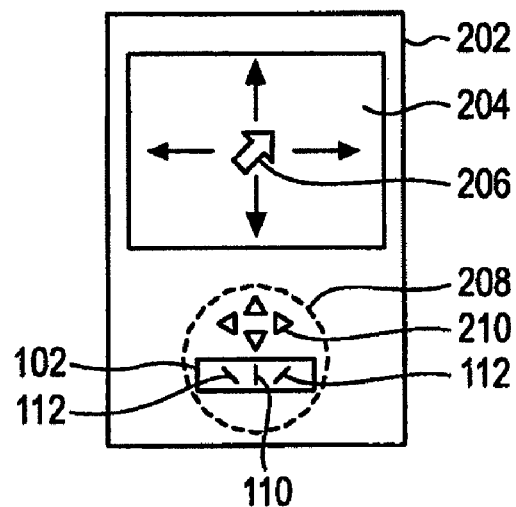
FIG. 2A is a diagrammatic view of a sensor configured according to the invention.

Referring to FIG. 2A, one practical application of a navigational system is illustrated, where a portable device 202, such as a portable music player, a cellular phone, PDA or other device, has a graphical user interface (GUI) or screen 204, a cursor 206 that may appear on the screen that is capable of being moved across the screen under control of a user navigating a touch-sensitive cursor 208. The touch sensitive cursor has navigational indicia 210, which may be merely directional indicators located about sensor 102 that is located within or about that touch-sensitive cursor that acts as a navigational pad, similar to that of a mouse pad commonly used on laptop computers. According to the invention, such a navigational pad can be greatly enhanced using sensor technology according to the invention, where directional movement sensors 110,112 are used to guide the cursor 206 for searching for and selecting indicia such as toolbar items or icons for opening files, photos and other items when selected. In some applications, a multi-step sensor can read the fingerprint structures for guidance at one level, and may select an indicia by pressing harder on the sensor for another level of sensing. Thus, a user can move the cursor around by lightly pressing on and moving a finger along the surface, then pressing harder when selecting an icon, toolbar or other indicia. Utilizing the invention, a more efficient navigation tool can be adapted to perform all of these tasks at low power and high accuracy, a very adaptable feature for portable devices.

Figure 2B:
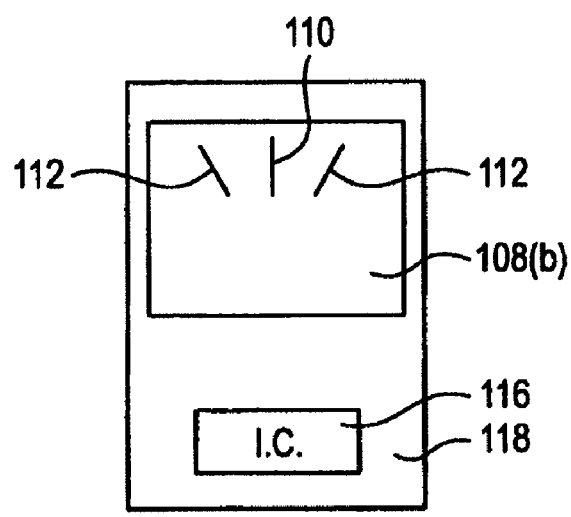
FIG. 2B is a diagrammatic view of a sensor configured according to the invention.
Figure 2C:
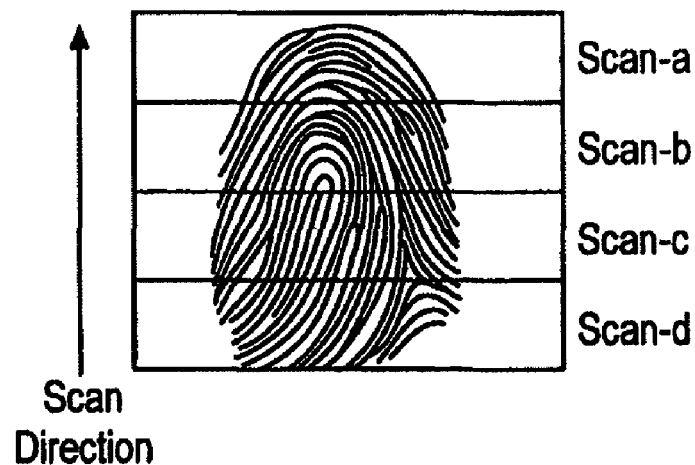
FIG. 2C is a diagrammatic view of a fingerprint scan result.
Figure 2D:
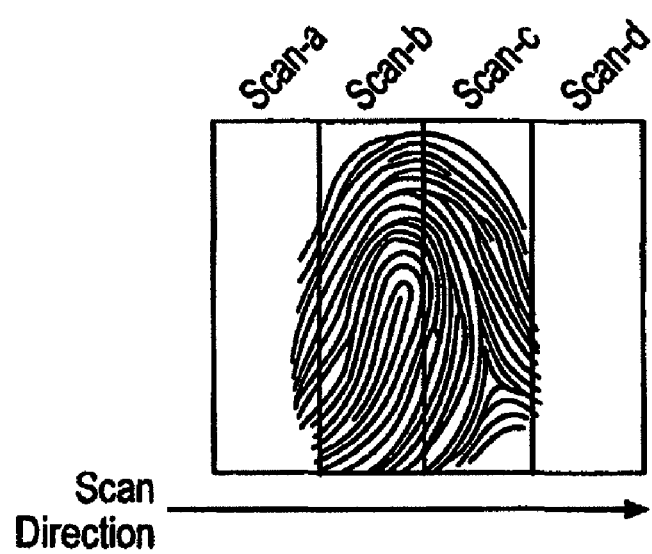
FIG. 2D is a diagrammatic view of a fingerprint scan result.

Referring to FIG. 2B, another embodiment of the invention is illustrated, where the integrated circuit (IC) chip 114 is separate from the sensor surface 108(b). In the illustration of FIGS. 1A and 1B, the sensor surface may be located on top of an IC as in many conventional configurations, but with the novel array sensors 110,112 of the invention. FIG. 2B illustrates a novel configuration where the sensor surface 108(b) is located on a film 118, ad the IC 116 is located separately, allowing for more flexible and useful applications. As discussed herein, the invention can be applied either type of configuration, and is adaptable to any application where motion and direction information may be useful, such as for navigating objects such as cursors on a graphical user interface, or other applications.

Referring again to FIG. 1A, the surface 108 has embedded motion sensors 112 that, according to the invention, operate to detect the presence and motion of a fingerprint surface 106 about the sensor surface 108. A single motion sensor 110, aligned with a general fingerprint motion direction for detecting distance traveled by the fingerprint across the sensor over a period of time. This allows a processor to compute the velocity of the fingerprint over the sensor surface. In another embodiment, there may be a single motion sensor 110 on the surface 108, or there may be a plurality, two or more motion sensors 110,112, on the surface 108, depending on the application. The additional sensors 112 may be used to detect direction of a fingerprint's motion across the sensor surface. In practical applications, a user may not move the finger exactly parallel with the sensor 110. A user may rub the fingerprint surface 106 at an angle with respect to the axis of the sensor 110. A processor analyzing the velocity of the fingerprint motion may then end up with an inaccurate velocity reading. This may be important when the data generated by the sensor is used for reconstructing a fingerprint, or when the sensor data is used for navigational purposes. According to this additional embodiment of the invention, the additional sensors 112 can be used to determine the direction of the fingerprint surface when it is being analyzed. Using the data captured by the sensors, a processor can apply vector analysis to generate motion information. This motion information can be used in processes for reconstructing the fingerprint images, or for navigation processes.

Figure 2E:
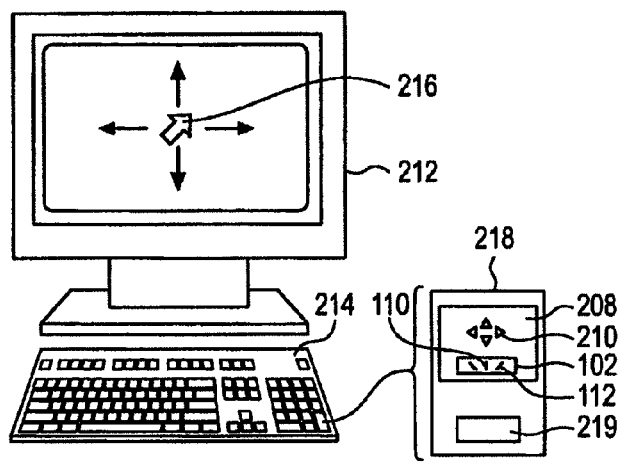
FIG. 2E is a diagrammatic view of a sensor configured according to the invention.

Referring to FIG. 2E, another application of a navigation sensor is illustrated as an alternative for providing navigational information to control a cursor 216 shown on computer monitor 212 of a conventional desktop computer system, where the navigational sensor 218 is provided as an alternative to a conventional mouse used for a computer. Such a mouse may be part of a keyboard as shown, or may be implemented as a separate device apart from the keyboard. The sensor 218 includes a sensor surface 208 that may have directional indicators 210 for a user, and array sensors 110,112. The IC 219 may be separate from the sensor surface 208 as described above along with other similar figures showing various embodiments.

Figure 2F:
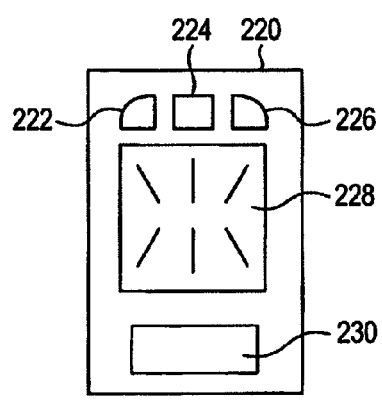
FIG. 2F is a diagrammatic view of a sensor configured according to the invention.

Referring to FIG. 2F, yet another embodiment of a navigational sensor 220 is illustrated, which can also be implemented as an alternative to a conventional computer mouse. The sensor 220 may include individual sensors 222,224,226 for individual activation by a user. These individual sensors may be simple pressure activated buttons, RF sensors, or other sensors for selecting or otherwise manipulating or activating objects chosen on a monitor with a cursor. Such individual sensors may be integrated on the device 220, such as on a common film, or may be separate yet accessible by a user's touch. Sensor pad 228 includes array sensors configured to sense motion of a fingerprint surface relative to the pad. IC 230 may be configured on the same film, or may be entirely separate. The sensor 220 may be implemented on a keyboard such as sensor 218 of FIG. 2E, or may be implemented on a laptop computer, cellular phone, personal data assistant, automotive dashboard, or other device that could utilize the operations of the navigational sensor.

Figure 2G:
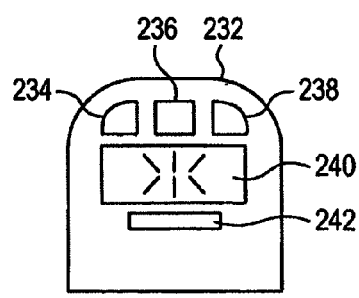
FIG. 2G is a diagrammatic view of a sensor configured according to the invention.

Referring to FIG. 2G, yet another embodiment of a navigational sensor 232 is illustrated. Sensor 232 is configured as a small fingerprint navigation sensor having sensors 234,236, 238, a narrow slit sensor surface 240 and sensor 242. Each of the sensors can be configured to sense motion, pressure or other stimuli performed by a user in navigating operations. Those skilled in the art will understand that many variations of sensors, buttons and other accessories can be implemented according to the invention to allow a user to operate different devices, systems and operations with navigation information.

FIGS. 3-7 discussed below have a similar numbering pattern, where the sensor surface 107 includes the two other sensing surfaces: fingerprint sensing surface 108 and motion sensors 110 and 112. The different motion sensing devices, whether included with an image sensor for sensing a finger print image for future reconstruction, can be utilized for navigational operations. These different embodiments are described below in relation to sensing, capturing and reconstructing fingerprint images, but are also applicable in providing motion and direction information for use as navigational information, such as for use in navigating a cursor relative to the motion of a fingerprint over motion sensors. The different embodiments, though similar in general function, are separately described to differentiate the different components in the different embodiments. These are intended as mere examples of different embodiments, and are not intended as an exhaustive set of samples. Again, those skilled in the art will understand that these and other embodiments of the invention described herein are illustrative of the invention and do not limit the spirit and scope of the invention, which is defined by the appended claims and all equivalents, including claims appended herein upon filing and also those as possibly amended at a later date.

Figure 3:
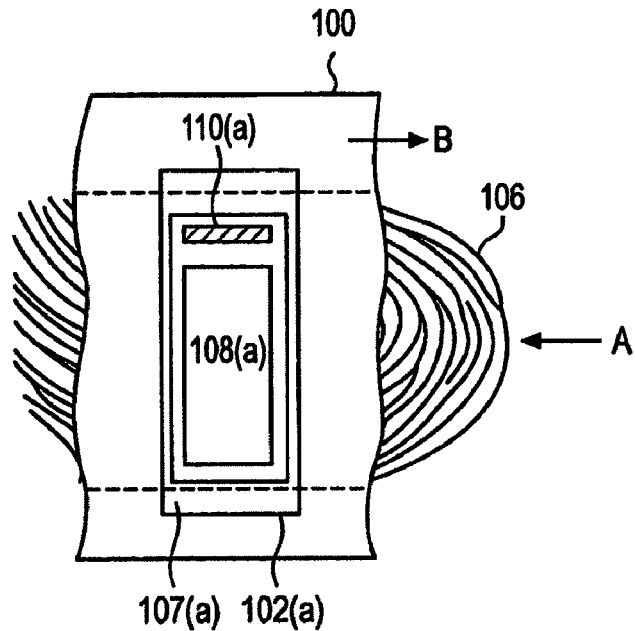
FIG. 3 is a diagrammatic view of a sensor configured according to the invention.

According to another embodiment 102($a$) of the invention illustrated in FIG. 3, the sensor surface 108($a$) may include image sensing elements used for broadly sensing and recording the fingerprint features. In addition, a motion sensor 110 ($a$) is included for sensing and recording the motion of the fingerprint. Such a device may be a single sensor embedded within the two dimensions of the sensor surface 107($a$), with the fingerprint sensing surface 108($a$) included for sensing and recording the full fingerprint. The motion sensors are configured to separately sense and recording motion information. Here, the sensor surface 107($a$) includes a motion sensor 110($a$) configured separately from fingerprint sensing surface 108($a$). According to this embodiment, the motion sensor is separate from the fingerprint sensing surface, though located on the same sensor surface. In operation, a fingerprint surface 106 can be moved simultaneously along motion sensor 110($a$) and fingerprint sensing surface 108($a$). The motion information from the motion sensor, such as distance and time traveled over that distance, can be utilized together with the fingerprint sensing surface as an aid in reconstructing the separate portions of the fingerprint. As described further below, such a single motion sensor can also be used for navigation functions as well.

Figure 4:
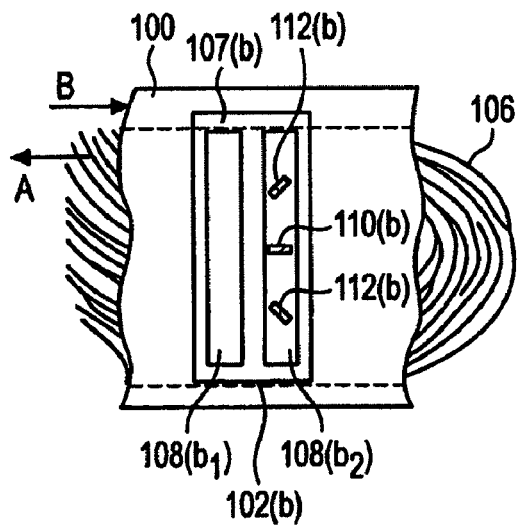
FIG. 4 is a diagrammatic view of a sensor configured according to the invention.

Referring to FIG. 4, another embodiment 102($b$) of the invention is illustrated where motion sensors 110($b$), 112($b$) are located about fingerprint sensor surface 108($b$) within sensor surface 107($b$). The motion sensor 110($b$) is located along an anticipated axis of motion of finger 106 with respect to device 100 in directions A, B. Motion sensor 110($b$) can sense the distance and time expended over that distance to determine velocity, which can be used in reconstructing the fingerprint portions simultaneously captured by fingerprint sensor surface 108($b$). Using the additional motion sensors 112($b$), a fingerprint surface 106 can be sensed and captured even if a user slides the finger at an angle to the axis of the motion sensor 110($b$). In fact, given the angles of the additional sensors 112($b$) with respect to the central axis of the device, the direction of motion can be computed by a processor using vector addition. Thus, the direction, distance and time expended during fingerprint surface travel across the sensors can be used along with the fingerprint portions captured by the fingerprint sensor to accurately reconstruct the fingerprint image. This can be done with a fraction of the processing power, and thus less power source power, than conventional methods and devices known in the prior art. Thus, the invention provides great utility for fingerprint reconstruction and verification for devices that have power and processing restrictions. As described further below, such multiple motion sensors can also be used for navigation functions as well.

Figure 5A:
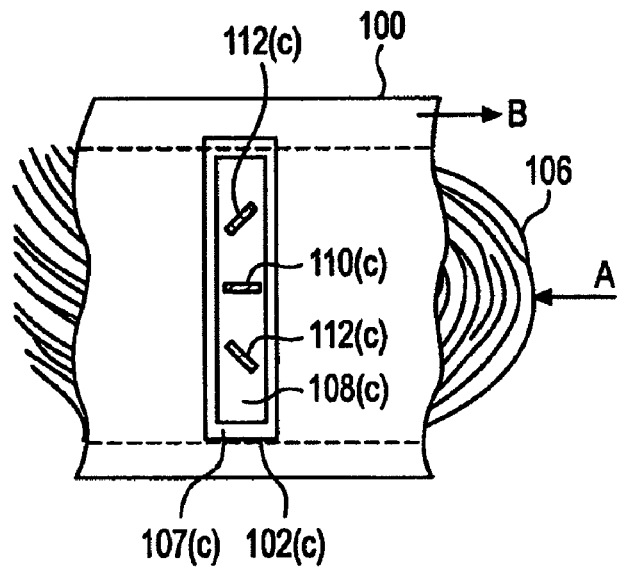
FIG. 5A is a diagrammatic view of a sensor configured according to the invention.
Figure 5B:
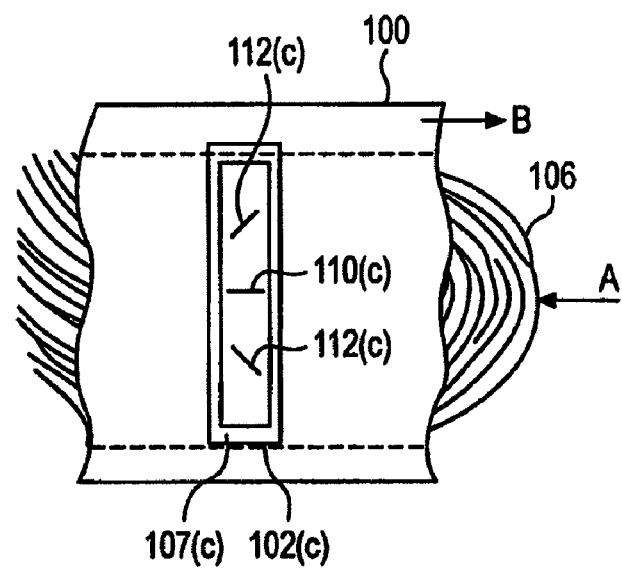
FIG. 5B is a diagrammatic view of a sensor configured according to the invention.

Referring to FIG. 5a, yet another embodiment 102(C) of the invention is illustrated, where the motion sensors 110(C), 112(C) are interleaved with fingerprint sensor surface 108(C) in a combined component within sensor surface 107(C). Such a configuration can be created in a sensor surface, where the pixels or data contact points that sense the fingerprint features are separately read from the sensors by a processor. For example, in a matrix of sensor pixels or data contact points, individual points can be singled out in one or more arrays to operate as motion sensing arrays. In the same matrix, the remaining pixels or data contact points can form a fingerprint sensor surface for sensing and capturing the fingerprint image. In operation, a fingerprint can be juxtaposed and moved along the sensor surface 107(C) along the anticipated axis of motion or at another angle, and an accurate sense and capture of a fingerprint can be achieved without undue computation and power load. While the fingerprint sensor surface 108(C) senses and captures the portions of images of the fingerprint features upon contact with the fingerprint surface 106, the motion sensors can simultaneously capture motion information as the features move past the motion sensors. The motion information can be used in combination with the portions of fingerprint images to reconstruct the fingerprint image. Referring to FIG. 5b, the same configuration of FIG. 5a is illustrated, with a view of the motion sensors shown much smaller in comparison to the overall sensor surface. In a sensor surface that is densely populated with pixels or data contact points, the relative size of the portion of the sensor surface that is covered with the motion sensing arrays are very small compared to the pixels and data points that make up the fingerprint sensing surface 108(C), both located within sensor surface 107(C). Thus, the fingerprint can be sensed and captured without any interference by the interleaved motion sensing arrays and accurate portions of a fingerprint image can be captured and accurately reconstructed using the combined information from the fingerprint sensors and the motion sensors. Utilizing this embodiment, a universal component can be constructed and utilized for both motion detection and fingerprint capture, and the results from both functions can be utilized to produce an efficient and power thrifty method of sensing, reconstructing and verifying a fingerprint. These motion sensors, which can sense both motion and direction, can also be used for navigation operations.

Figure 6:
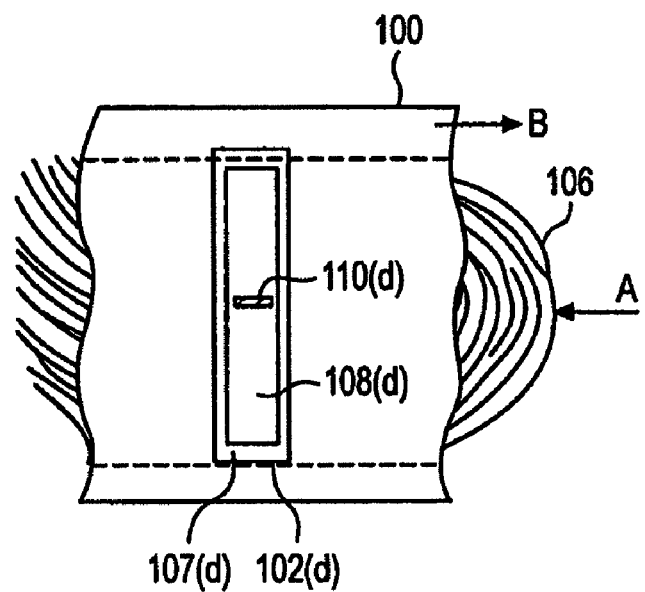
FIG. 6 is a diagrammatic view of a sensor configured according to the invention.

Referring to FIG. 6, another embodiment 102(d) of the invention is illustrated, where a single motion sensor array 110(d) is interleaved within the fingerprint sensor surface 108(d) of sensor surface 107(d). Unlike the embodiment illustrated in FIGS. 5a, 5b, this embodiment is limited to one motion sensor array located along the anticipated axis of motion of the finger, which is anticipated to move in directions A, B with respect to the device 100. In operation, the interleaved sensor array 110(d) can sense and capture motion information regarding the motion of the finger across the sensor surface 107(d), while simultaneously fingerprint sensor surface 108(d) can sense and capture the fingerprint images for subsequent reconstruction. The information from both sensors can be used to more accurately reconstruct the fingerprint image. The information of both motion and direction can also be used for navigation operations.

Figure 7:
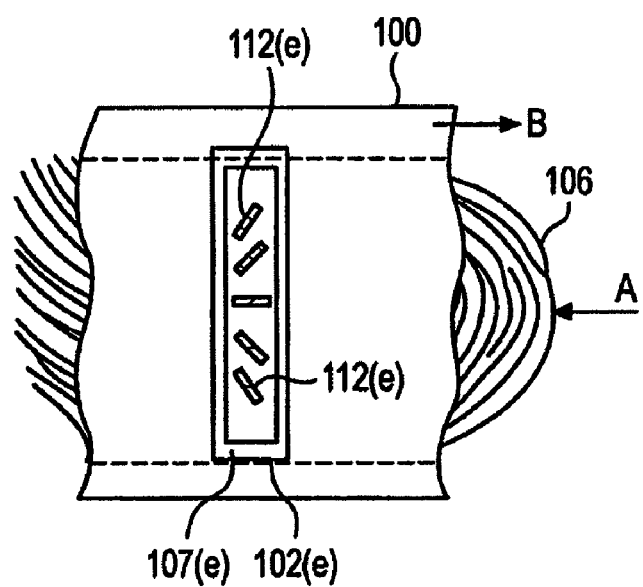
FIG. 7 is a diagrammatic view of a sensor configured according to the invention.

Referring to FIG. 7, yet another embodiment 102(e) of the invention is illustrated, where multiple motion sensors 112(e) are interleaved within fingerprint sensor surface 108(e). This embodiment is similar to that illustrated in FIGS. 5a, 5b, but with more motion sensors at various angles. In operation, a fingerprint can be juxtaposed and moved along the sensor surface 107(e) along the anticipated axis of motion or at another angle, and an accurate sense and capture of a fingerprint can be achieved without undue computation and power load. While the fingerprint sensor surface 108(e) senses and captures the portions of images of the fingerprint features upon contact with the fingerprint surface 106, the motion sensors can simultaneously capture motion information as the features move past the motion sensors. The motion information can be used in combination with the portions of fingerprint images to reconstruct the fingerprint image. Those skilled in the art will understand that many variations on the concept of multiple motion sensors embedded or interleaved within the sensor surface are possible, and that different applications will have varying demands for the different sensor features. The information of both motion and direction can also be used for navigation operations.

If used for navigation purposes, of the motion sensor configurations above can be utilized for different navigation operations. For example, referring again to FIG. 3, the motion sensor 110(a) can be utilized on its own to sense motion in one axis of motion, for example in one direction. One application may be a sensor used for a power, volume or other audio control, where an up or down motion can be used to adjust the power, volume or other audio value. Another application for the invention is the implementation of a scroll function for lists of data or text in a GUI. Precise power control over a range may be useful in manufacturing environments, where small changes in power can greatly affect a process. Another application may be to operate a medical instrument where accuracy is useful to the device's operation.

Navigation can be most useful in two dimensional space, where motion and direction information are required. In prior art motion sensors, only one-directional motion can be detected, and, as discussed above, even the most basic motion detection requires a large amount of computation and processing resources. According to the invention, a navigation sensor can be configured to sense motion and direction. The motion and direction information can then be processed for use in various navigation operations for devices, such as to operate as a computer mouse for example. Referring again to FIG. 4, a separate motion sensor 110(b) is illustrated for individual sensing of motion and direction, where distance, time expended over the distance (allowing for calculation of velocity), and direction can be calculated. Though this motion information can be used to enable better processing and reconstruction of fingerprint images as discussed above, it can be used separately for navigation, making it a navigation sensor. In operation, the separate motion sensor can detect motion and direction, giving information required for navigation functions. In operation, a navigation sensor can consistently computing the matches for the various axes, generating motion and direction information as a fingerprint moves about a sensor.

Thus, if a user would stroke a fingerprint surface against a motion sensor surface, the arrays could pick up the motion and direction information, and a processor could process the information to generate relative motion and direction information for use in navigation, such as for a computer mouse. In this example, a user can move a finger relative to a cursor on a graphical user interface (GUI), such as a computer screen, a cellular phone, a personal data assistant (PDA) or other personal device. The navigation sensor could then cause the cursor to move relative to the fingerprint motion, and a user can navigate across the GUI to operate functions on a computer or other device. Since the motion of the cursor is relative to the movement of the fingerprint surface against the navigation sensor, relatively small movements can translate to equal, lesser or even greater distance movement of the cursor.

One aspect of the invention that is very useful to navigation configurations is the ability to consistently generate a motion result. As discussed above, the invention provides a means to substantially ensure a result when a fingerprint moves across a motion sensor. This is true for single array motion sensors as well as multiple array sensors used for two-dimensional motion processing. In a navigation application, such a configuration can provide accurate and consistent motion and directional information that allows for smooth and reliable navigational operations.

Figure 8A:
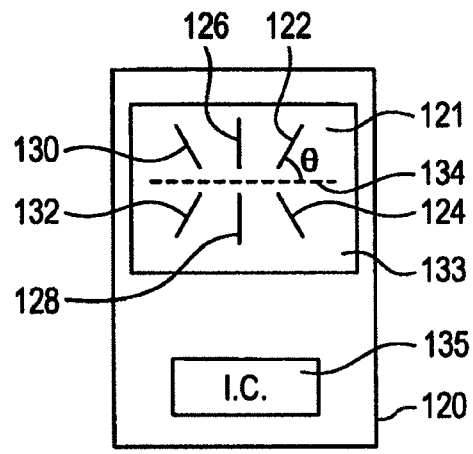
FIG. 8A is a diagrammatic view of a sensor configured according to the invention.

Referring to FIG. 8A, another embodiment of the invention is illustrated, where multiple arrays are located on the sensor surface to allow for sensing and capturing motion and direction information in different directions of fingerprint travel for use in navigation applications and other applications. The base film 120, which may be a 35 mm film or other material, includes a sensor surface 121 having several motion sensor arrays. Similar to the three sensor array illustrated in FIG. 5A, there are three sensors that fan upward for detecting motion and direction. In operation, a user typically will stroke over the sensor in a downward direction, and the three sensors can determine the direction and speed using vector analysis. However, it may be desired to account for motion in either an upward or downward direction, and multiple sensors in either direction would be useful to better capture the information. From an orientation of a user facing the sensor illustrated in FIG. 8(a), the right sensors 122,124 face the right, and are configured to capture movement toward the right, where either sensor could capture movement motion from the upper right to the lower left, and from the upper left to the lower right. Sensors 126,128 could capture up or down movement, and sensors 130,132 face the left, and are configured to capture movement toward the right, where either sensor could capture movement motion from the upper right to the lower left. Utilizing the multiple sensors, a sensor would be more robust, capable of sensing more fingerprint features, and also able to process more movement and directional information for use in capturing and reconstructing fingerprint images or for other applications such as navigation. The angle θ occurring between sensor 121 and center horizontal line 134 can be any angle, such as 30, 45 or 22.5 degrees in order to most effectively capture movement that is not aligned with center sensors 126,128. All off-axis sensors 124,128,130,132 can be set at various angles, which can depend on a particular application.

Figure 8B:
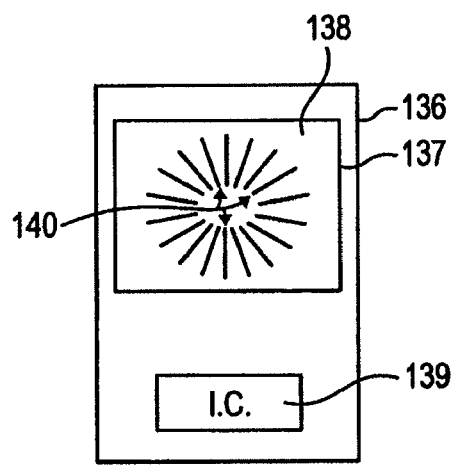
FIG. 8B is a diagrammatic view of a sensor configured according to the invention.

Referring to FIG. 8B, an even more robust example of a sensor set on film 136 having a surface 137 located on the film. The sensor 138 is located on the film surface 137, and includes multiple array sensors 140 that are set at various angles. In this embodiment, each array may be set at 22.5 degrees from adjacent angles, providing a wide variety of angles at which to sense and capture motion information. The sensor, similar to that of FIGS. 8(a) and 2B, has an IC chip 139 that is separate from the sensor surface 138.

Figure 8C:
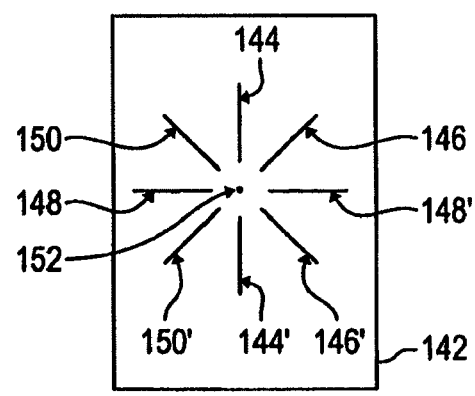
FIG. 8C is a diagrammatic view of a sensor configured according to the invention.

Referring to FIG. 8C, a diagrammatic view of multiple array sensors located on a sensor 142 is illustrated. Sensors 144,144' are vertical arrays that are set to capture one axis of motion. Sensors 146,146' and 150,150' are located off axis at an angle to sensors 144,144'. Sensors 148,148' are optional and may be used in conjunction with the other sensors to gather motion information in a horizontal direction with respect to the vertical sensors. In practice, either or all of these sensors can be utilized by a system to accurately sense and capture motion and direction information in multiple directions. Again, which sensors to use may depend on a particular application and configuration.

In one embodiment, in order to support motion at any arbitrary angle, sensor arrays may be oriented at approximately 0, 30, 60, 90, 120, and 150 degrees. Another more robust system might space them at 22.5 degree increments, rather than 30. Once motion reaches 180 degrees, the process can use reverse motion on the zero degree sensor array, and so on. A device configured in this way would have some of the properties of a navigation touchpad such as those used in laptop computers, with the relative motion sensing capability of a computer mouse.

Figure 9A:
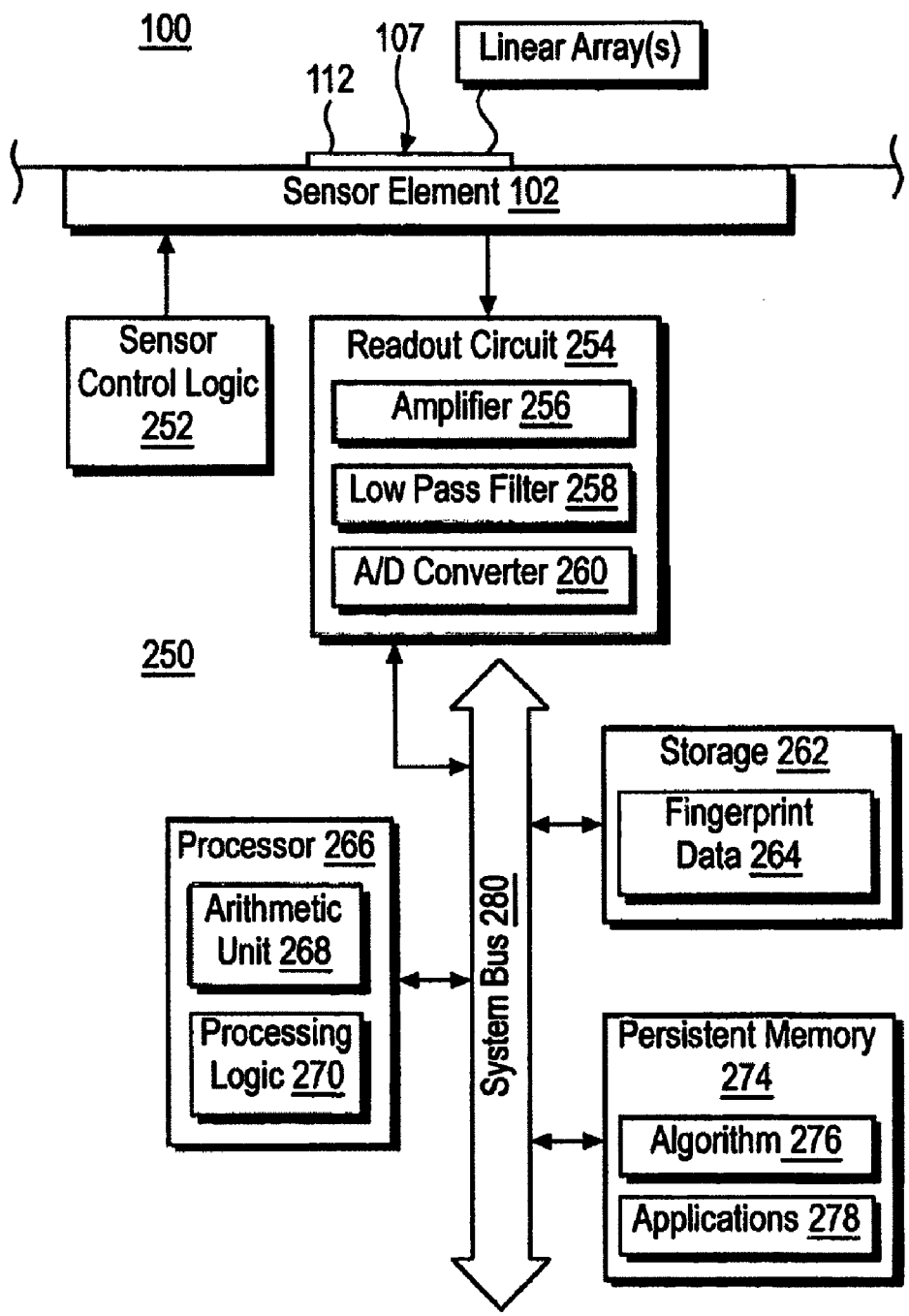
FIG. 9A is a diagrammatic view of a system configured according to the invention.

Referring to FIG. 9A, a diagrammatic view of a sensing device 100 configured according to the invention is illustrated. The device includes a linear array 112 such as described in the embodiments above, and also includes a sensor element 102 also discussed above. The device further includes sensor control logic 252 configured to control the basic operations of the sensor element. The exact operations of the sensor element governed by the sensor logic control greatly depends on a particular sensor configuration employed, which may include such as power control, reset control of the pixels or data contact points, output signal control, cooling control in the case of some optical sensors, and other basic controls of a sensor element. Sensor controls are well known by those skilled in the art, and, again, depend on the particular operation. The device further includes a readout circuit 254 for reading analog output signals from the sensor element when it is subject to a fingerprint juxtaposed on the sensor surface 107. The readout circuit includes an amplifier 256 configured to amplify the analog signal so that the it can more accurately be read in subsequent operations. Low pass filter 258 is configured to filter out any noise from the analog signal so that the analog signal can be more efficiently processed. The readout circuit further includes an analog to digital converter 260 that is configured to convert the output signal from the sensor element to a digital signal that indicates a series of logic 0's and 1's that define the sensing of the fingerprint features by the pixels or data contact points of the sensor surface 107. Such signals may be separately received by the motion sensors and the fingerprint sensing surfaces as discussed in the embodiments above, and may be read out and processed separately. The readout circuit may store the output signal in storage 262, where fingerprint data 264 is stored and preserved, either temporarily until the processor 266 can process the signal, or for later use by the processor. The processor 216 includes arithmetic unit 268 configured to process algorithms used for navigation of a cursor, such as that described in connection with navigation features of FIG. 2b, and for reconstruction of fingerprints. Processing logic 270 is configured to process information and includes analog to digital converters, amplifiers, signal filters, logic gates (all not shown) and other logic utilized by a processor. Persistent memory 274 is used to store algorithms 276 and software applications 278 that are used by the processor for the various functions described above, and in more detail below. The system bus 280 is a data bus configured to enable communication among the various components in the system 100.

Figure 9B:
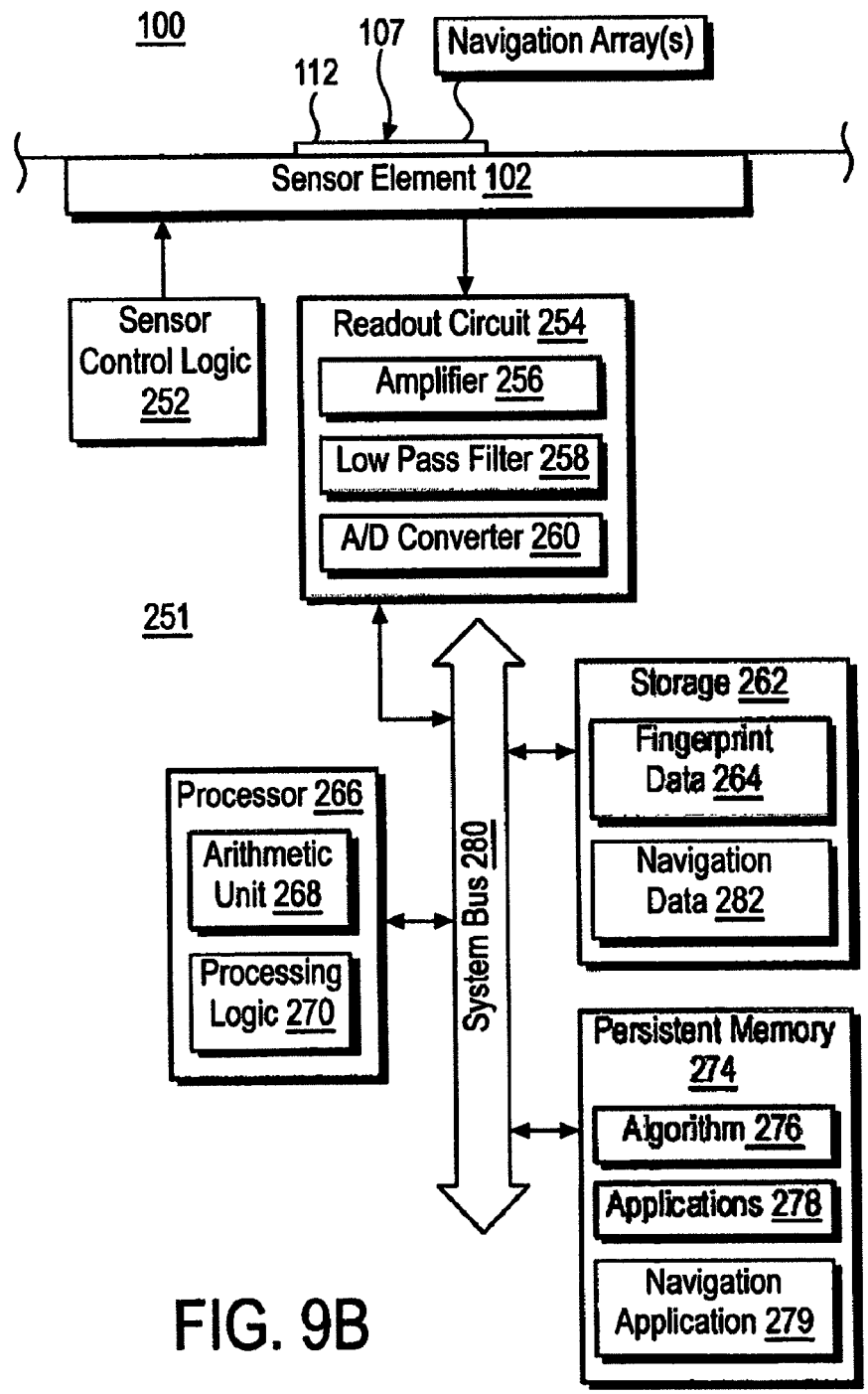
FIG. 9B is a diagrammatic view of a system configured according to the invention.

Referring to FIG. 9B, another embodiment of the invention is illustrated as a system 100 configured to sense, capture and process navigation information. The device includes a linear navigation array(s) 112 such as described in the embodiments above, and also includes a sensor element 102 also discussed above. The surface may include a single array for one-dimensional navigation capabilities, or may include multiple arrays for capturing both motion and directional information for use in navigation applications. The device further includes sensor control logic 252 configured to control the basic operations of the sensor element. The exact operations of the sensor element governed by the sensor logic control greatly depends on a particular sensor configuration employed, which may include such as power control, reset control of the pixels or data contact points, output signal control, cooling control in the case of some optical sensors, and other basic controls of a sensor element. Sensor controls are well known by those skilled in the art, and, again, depend on the particular operation. The device further includes a readout circuit 254 for reading analog output signals from the sensor element when it is subject to a fingerprint juxtaposed on the sensor surface 107. The readout circuit includes an amplifier 256 configured to amplify the analog signal so that the it can more accurately be read in subsequent operations. Low pass filter 258 is configured to filter out any noise from the analog signal so that the analog signal can be more efficiently processed. The readout circuit further includes an analog to digital converter 260 that is configured to convert the output signal from the sensor element to a digital signal that indicates a series of logic 0's and 1's that define the sensing of the fingerprint features by the pixels or data contact points of the sensor surface 107. Such signals may be separately received by the motion sensors and the fingerprint sensing surfaces as discussed in the embodiments above, and may be read out and processed separately. The readout circuit may store the output signal in storage 262, where fingerprint data 264 is stored and preserved. Navigation data 282 may also be stored in storage 262 for use according to the invention. This may be stored either temporarily until the processor 266 can process the signal, or for later use by the processor. The processor 216 includes arithmetic unit 268 configured to process algorithms used for navigation of a cursor, such as that described in connection with navigation features of FIG. 2b, and for reconstruction of fingerprints. Processing logic 270 is configured to process information and includes analog to digital converters, amplifiers, signal filters, logic gates (all not shown) and other logic utilized by a processor. Persistent memory 274 is used to store algorithms 276, software applications 278 and navigation software application 279 that are used by the processor for the various functions described herein. The system bus 280 is a data bus configured to enable communication among the various components in the system 100.

Figure 10:
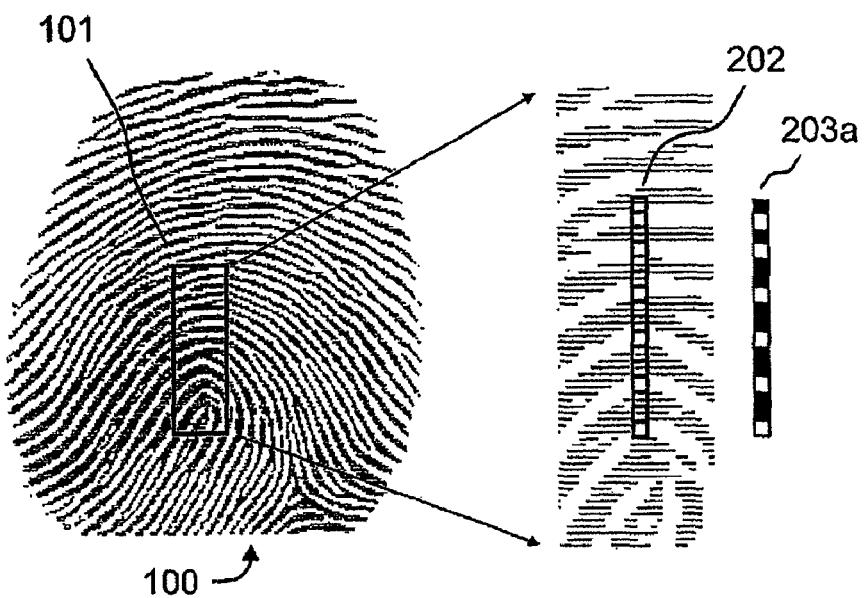
FIGS. 10A is a diagrammatic views of a sensor and fingerprint configured according to the invention.
FIGS. 10B is a diagrammatic views of a sensor and fingerprint configured according to the invention.
Figure 10:
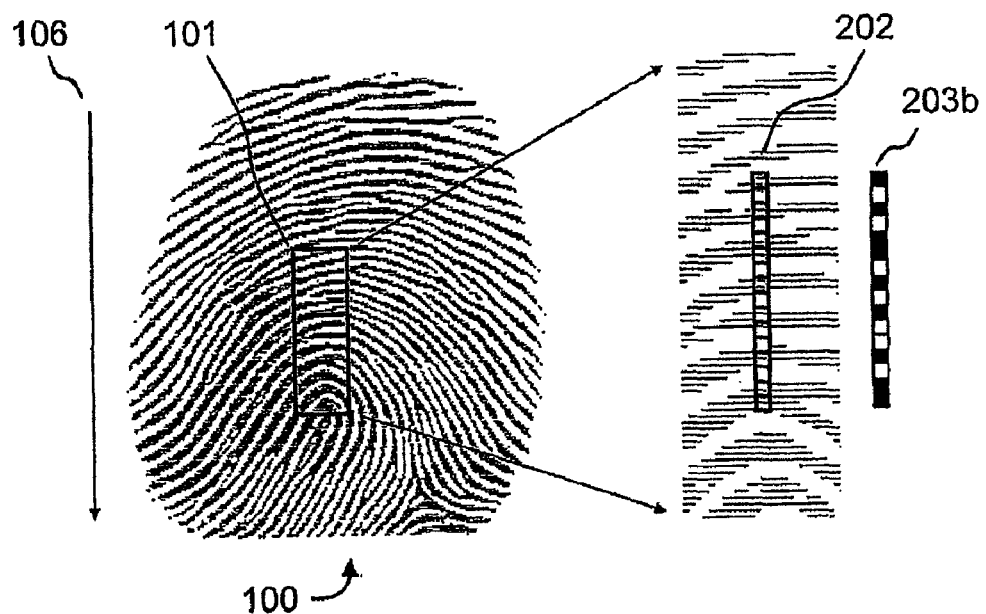

FIGS. 10A and 10B depicts the operation of the invention as a section 101 of fingerprint 100 passes over the sensor array 202. Sensor array 202 is comprised of a number of imaging pixel elements arranged along the axis of motion of the finger with a sufficient pixel density to resolve fingerprint ridges and valleys, typically 250-500 dpi. The pixels may sense the presence or absence of the fingerprint ridge through a variety of techniques, such as capacitance, optical imaging, or mechanical pressure. The array of imaging pixels 202 is sampled at a predetermined rate, sufficient to ensure that the finger will not travel more than two pixels in a sample period. Any reasonable time period could be set, but one example is 500 usec. In this embodiment, the pixels are configured as a single extended array, and software may subdivide the larger array into a number of potentially overlapping windows.

At each sample time, the state of the sense elements is converted to a series of numerical values from digitized segments 203a, 203b. For the sake of simplification, digitized segments 203a,203b shows a binary digitization, indicating presence or absence of ridge. The sensor values may be encoded with a higher precision if the chosen sensor methodology allows. Because the two image samples 203a and 203b were taken along the axis of motion 106 at different times, they may be sequentially shifted and compared against each other until a match is found for an absolute distance of motion D in the period between the samples T, resulting in a direct finger velocity measurement D/T.

Unlike conventional systems and methods, the system does not have to accumulate a large time history when no motion is detected between samples 203a and 203b. It can simply maintain the earlier sample 203a, and perform a new computation when the next sample is acquired. This is advantageous in the case where there is no prior knowledge of the approximate velocity speed of the finger. Often in practice, the finger velocity relative to the sensory surface may vary greatly. The invention eliminates the need for a large buffer of samples to cover a wide dynamic range of finger speeds.

A further advantage offered by the invention is the ability to adjust the sample rate and therefore the distance of motion traveled between samples as a function of finger velocity. As the finger velocity increases, the number of sample periods required to traverse between two adjacent pixels decreases. This effectively decreases the resolution of a velocity measurement. And, as the uncertainty of the measurement approaches the measurement period, all resolution is lost. Accordingly, in order to maintain the accuracy of the estimated velocity, the measurement system may adjust the sample rate to optimize the distance traveled when looking for a match between two frames. For example, requiring ten pixels of motion at fast finger swipe speeds can ensure a 10% accuracy in velocity measurements. Conversely, as the finger velocity decreases, the number of time samples required to travel a significant distance increases. In this case, the system could decrease the sample rate and reduce the distance traveled for a match to as little as one pixel. This would provide a significantly more rapid response to motion changes in navigation applications and would better tract finger velocity changes used to reconstruct two dimensional images from a one dimensional sensor. Those skilled in the art will understand that there are various methods for changing the sample rate in order to achieve these and other objectives, and the invention is not limited to any particular method, and moreover is inclusive of the various known methods as well as methods readily ascertainable by one skilled in the art without undue experimentation.

Figure 11:
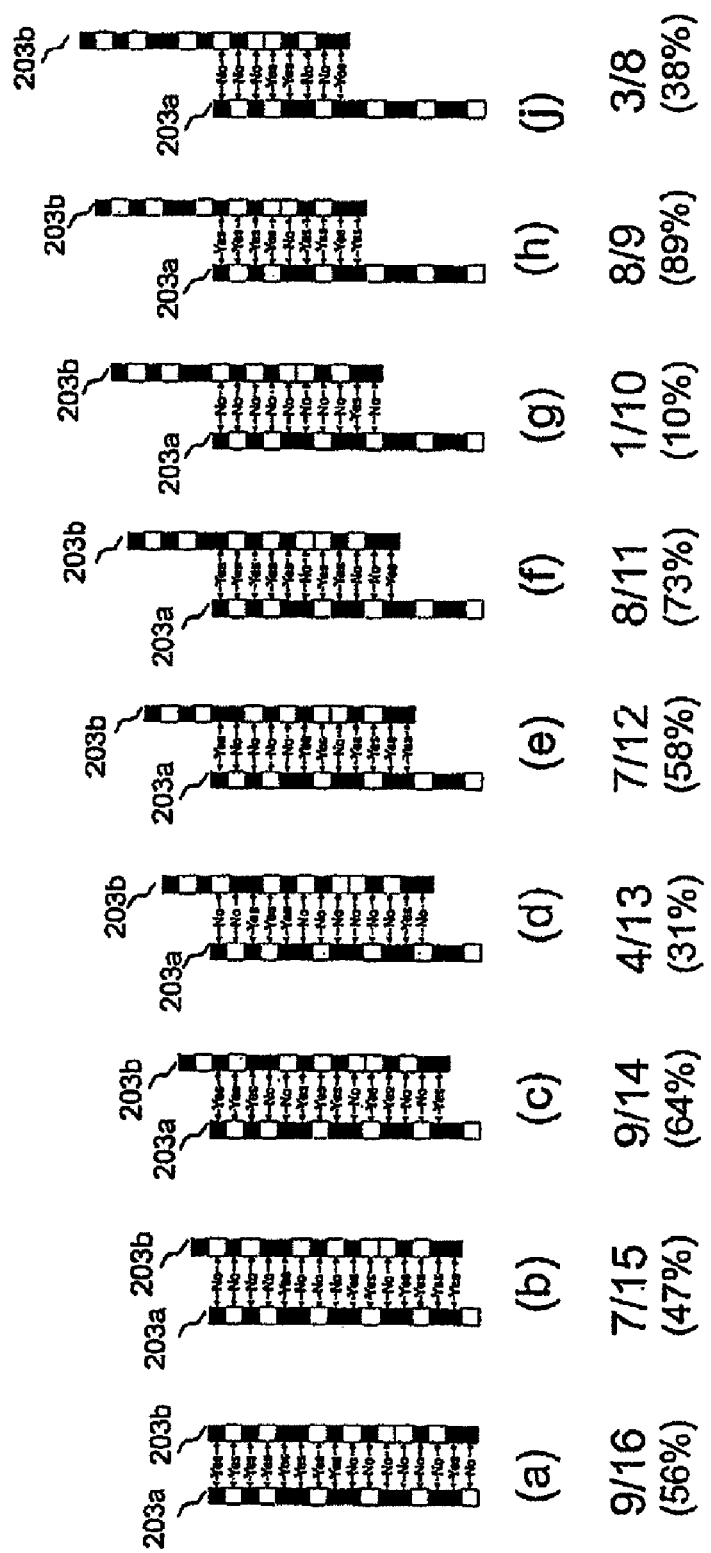
FIGS. 11 is a series of diagrammatic views of a sensor and fingerprint configured according to the invention.

FIGS. 11a and 11b show the digitization results sampled at two instances 203a and 203b as the finger moves in a downward direction 106. In this example, the finger has traveled downward approximately 7 pixels between samples 203a and 203b. FIGS. 11a-11j illustrate results from a similarity comparison between samples 203a and 203b that were converted into binary numbers, giving the following match results:

| Pixel Shift | FIG. 11 | Score |
| --- | --- | --- |
| 0 | (a) | $(9/16) \sim .56$ |
| 1 | (b) | $(7/15) \sim .47$ |
| 2 | (c) | $(9/14) \sim .64$ |
| 3 | (d) | $(4/13) \sim .31$ |
| 4 | (e) | $(7/12) \sim .58$ |
| 5 | (f) | $(8/11) \sim .73$ |
| 6 | (g) | $(1/10) = .10$ |
| 7 | (h) | $(8/9) \sim .89$ |
| 8 | (j) | $(3/8) \sim .38$ |

The match results show a strong correlation with the actual motion of seven pixels of vertical distance clearly distinguished in just one sample pair, even though the ridge frequency is fairly uniform for the selected segment of the fingerprint. It should also be clear to those knowledgeable in the art that the accuracy of the match would be significantly enhanced by additional levels of gray scale in the pixel data.

Figure 12:
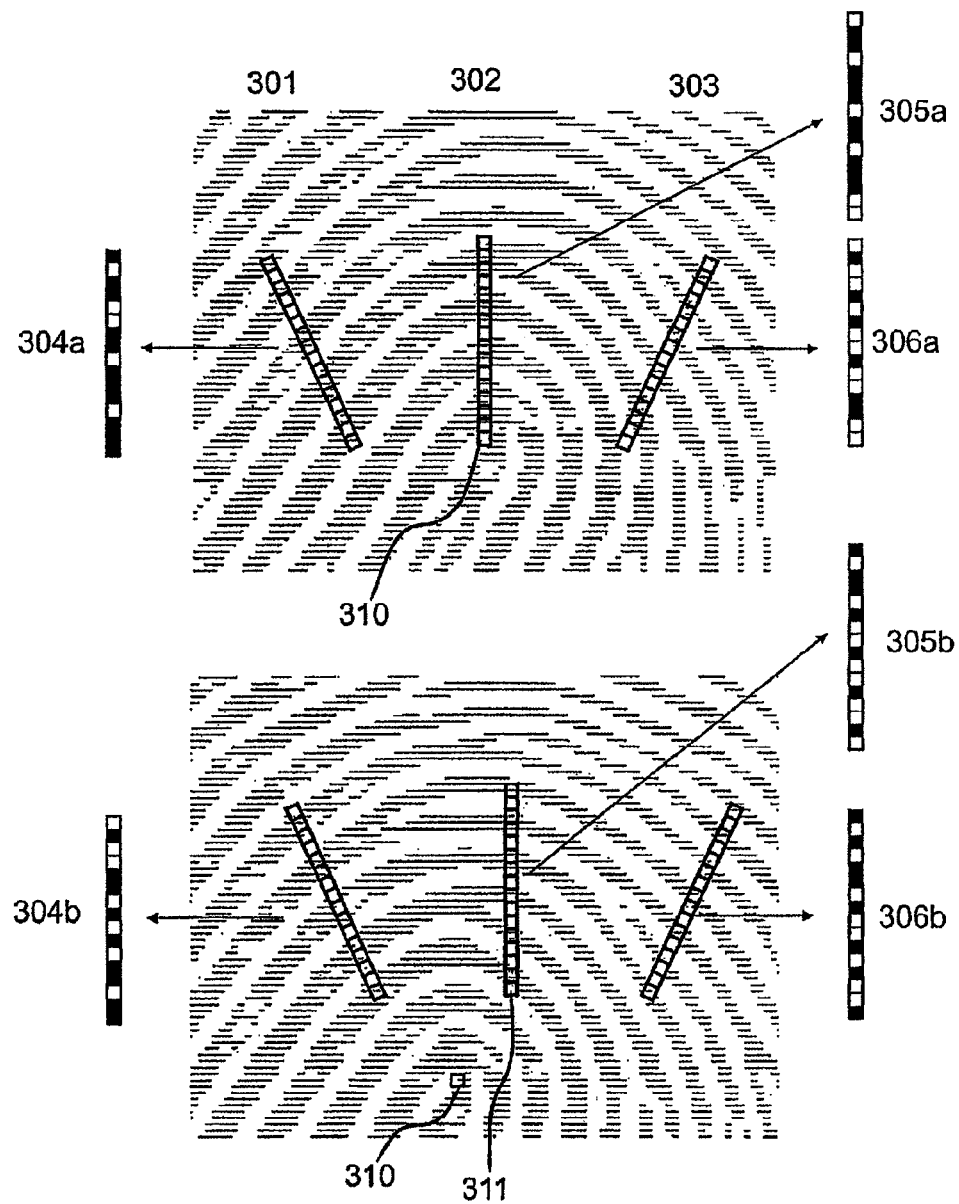
FIGS. 12a-b show a diagrammatic view of a sensor and fingerprint configured according to the invention.
FIG. 12c is a flow diagram of method configured according to the invention.
Figure 12:
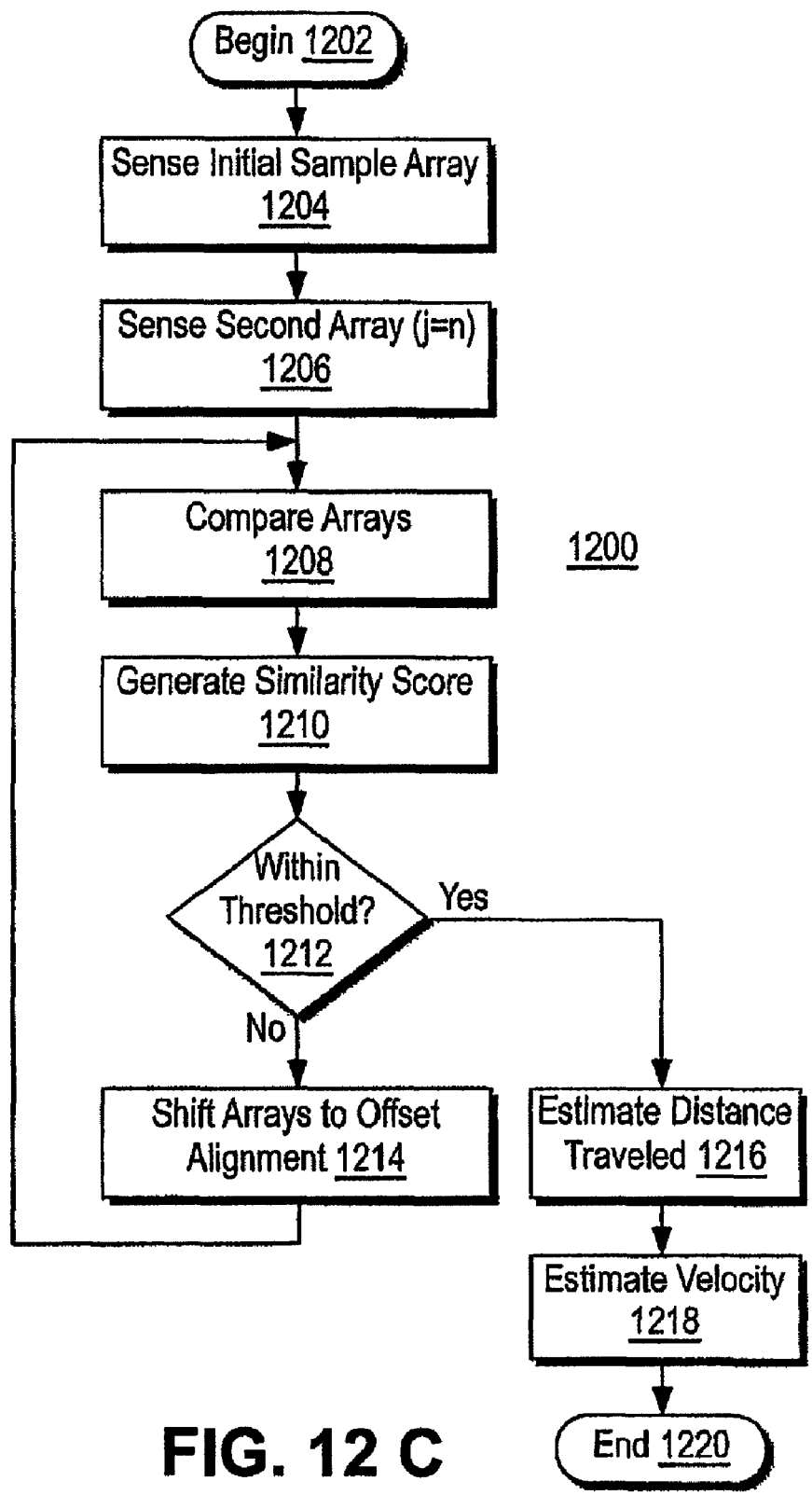

FIGS. 12*a* and 12*b* depict an embodiment of the invention that includes three linear arrays disposed at different angles to measure motion across a range of angles from the principal axis (in this case +/−25 degrees from the main axis). The central imaging array 302 is augmented with an array 301 oriented at a −25 degree angle to the central axis and an array 303 oriented at a +25 degree angle to the central axis. It will be understood by those skilled in the art that, given this disclosure, various different angles of the arrays can be implemented, as well as different numbers of arrays. In FIG. 12*a* we see the image of a fingerprint at the initial starting position superimposed on the sensor arrays, and the resulting binary images 304*a*, 305*a*, and 306*a* with the finger in the initial position. In FIG. 12*b*, the finger has moved a short distance at an approximately +25 degree angle shown between positions 310 and 311, and the resulting binary images are shown in 304*b*, 305*b*, and 306*b*. The following table shows the results of binary comparison for the pairings of 304*a*/304*b*, 305*a*/305*b*, and 306*a*/306*b* using the shift and compare method previously described:

| Pixel Shift | Score 304 | Score 305 | Score 306 |
|---|---|---|---|
| 0 | 0.38 | 0.44 | 0.38 |
| 1 | 0.67 | 0.47 | 0.67 |
| 2 | 0.64 | 0.43 | 0.21 |
| 3 | 0.38 | 0.54 | 0.77 |
| 4 | 0.50 | 0.33 | 0.50 |
| 5 | 0.82 | 0.36 | 0.18 |
| 6 | 0.40 | 0.60 | 1.00 |
| 7 | 0.44 | 0.44 | 0.22 |
| 8 | 0.50 | 0.25 | 0.50 |

Because the motion principally follows the axis of sensor 303, the correlation for the pairing 306*a*/306*b* is strong at the correct six pixel distance, but the pairings 304*a*/304*b*, and 305*a*/305*b* show weak correlation. When the direction of motion is at an angle between the axes of any two of the sensor arrays, a correlation will be found in both of the sensors, and the true motion will be found by taking the vector sum of the estimates from the two sensors.

The example above covers the simple case where the motion is completely aligned with one of the sensor axes. In the case of motion that lies between two axes, the distance a feature travels along a sensor array will be less than the entire length of the sensor. To detect motion across a range of angles, sensor arrays must be provided at a series of angles disposed so that a match will be found on at least two of the sensor arrays. For example, by arranging the arrays in 30 degree increments across the allowable range of motion axes, it is possible to ensure that if there is worst case alignment (i.e. a 15 degree misalignment between the actual axis of motion an the two sensor arrays on either side of it), an image feature will still approximately follow the nearest sensor arrays for more than three pixels of travel. Thus, by sampling the sensor arrays fast enough to ensure that the finger has not traveled more than three pixels between samples, it is possible to determine the axis of motion by finding the adjacent pair of sensors with the highest correlation, and computing the vector sum of the distances traveled along each of them.

Referring to FIG. 12C, a flow chart 1200 is illustrated that shows one embodiment of a motion sensor process that can be used for simply detecting and sensing motion, in conjunction with an image sensor for use in reconstructing a fingerprint image, for use in navigation applications or other applications where accurate motion sensing is desired. The process begins at step 1202. In step 1204, an initial sample array of a fingerprint is sensed. In step 1204, a second sample array is sensed after a period of time, t=n. The arrays are converted into a digital representation of the array of fingerprint sensors, and a digital string of digital ones and zeros is used by a processor to determine the relative movement between the two samplings. In practice, a predetermined period of time can be selected, or it can alternatively be measured, where time is measured between the first and second samples. In either case, once the distance is determined between the two samples, assuming that movement has occurred, velocity can be calculated using the distance traveled divided by the time expended during such travel. Continuing, in step 1208, the two arrays are compared. In an initial alignment, referring briefly to FIG. 10, the arrays are compared side by side. If this comparison shows a high correlation, then it is indicative of no relative motion between the fingerprint and the motion sensor.

In step 1210, a similarity score is generated, defining the amount of correlation between the two arrays. This may be in the form of a probability value, a percentage correlation value, or other mathematical value that can be used by the processor to determine the best similarity score among different comparisons. In step 1212, it is determine whether the similarity score falls within a threshold. In one embodiment, the threshold is a predetermined number that is decided according to a particular application. In practice, the invention can be configured to produce correlations that are of a high value, thus justifying a high threshold. Those skilled in the art will understand that such a threshold can be determined without undue experimentation, and that is depends on an application. If the score does not fall within the threshold, then the arrays are shifted to offset alignment in step 1214. The direction of the shifting may be done according to a predicted direction that a user would be expected to move the fingerprint surface across the sensor. If it is not known, or if the design calls for either direction, then flexibility can be accommodated by shifting the arrays in multiple directions until an alignment is reached that is within the threshold. In either case, the process returns to step 1208, where the arrays are compared again. A new similarity score is generated in step 1210, and the new score is measured against the threshold. This process can be reiterated until a score passes the threshold, and could possibly register an error if one is not met over time or a predetermined number of cycles. In a practical application, the two arrays can be shifted and processed once for each pixel in one array, since they are equal in length given that they were taken from the same array. If a score occurs that is within the threshold, then the distance is estimated in step 1216. This can be done by simply counting the number of pixels in which the arrays were shifted before a score occurs within the threshold, and multiplying this number by the distance between pixels, which can be estimated to be the distance between midpoints of two pixels. The distance can be accurately measured by sampling distances between individual pixels and groups of pixels in an array, but the exact method of measurement would depend on the application. Then, the velocity can be estimated in step 1218 by dividing the distance traveled by the time expended during the travel. The process ends at step 1220, where an estimated velocity value can be generated.

Figure 13:
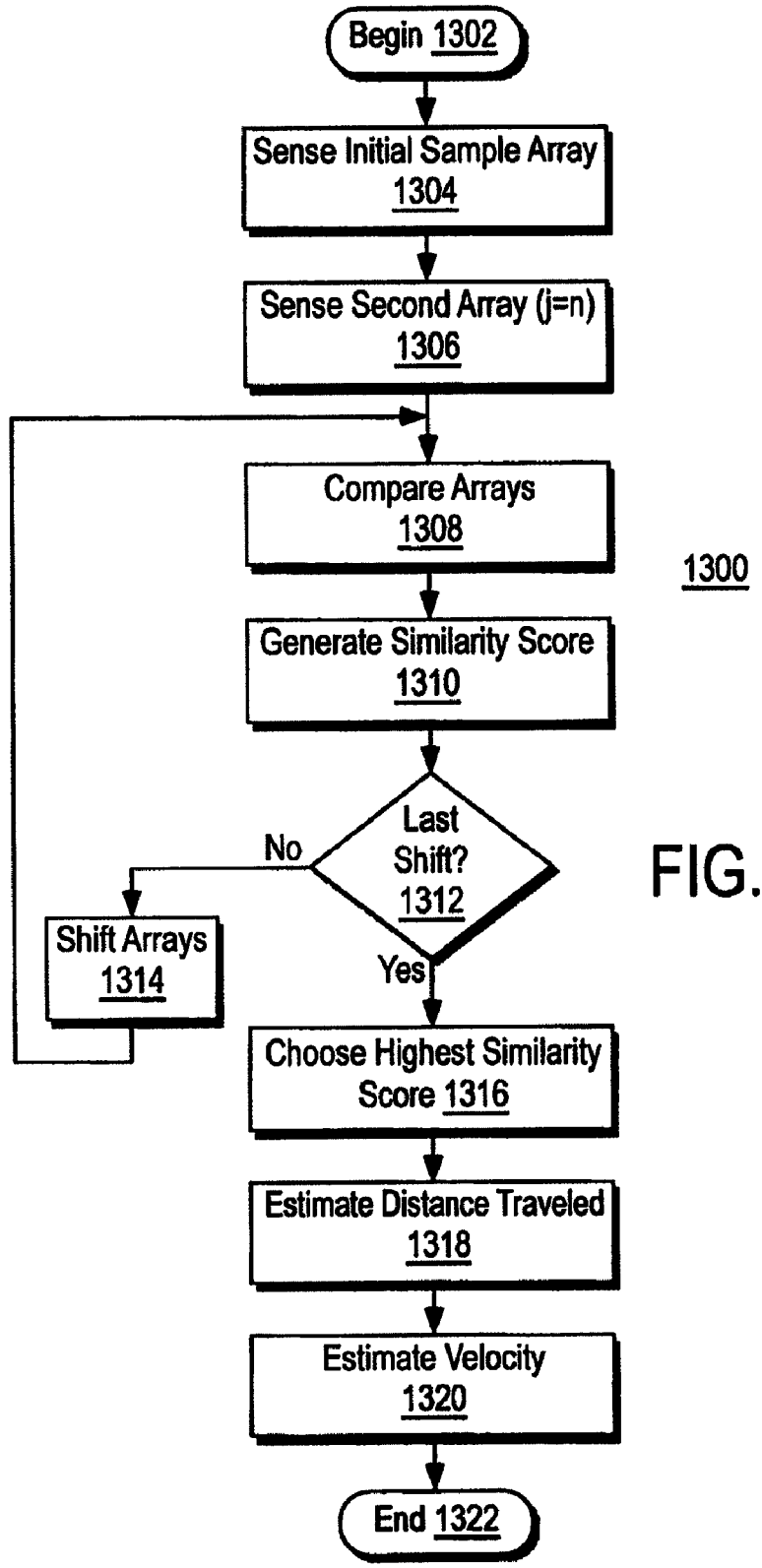
FIG. 13 is a flow diagram of method configured according to the invention.

Referring to FIG. 13, another flow chart 1300 is illustrated that shows one embodiment of a motion sensor process that can be used for simply detecting and sensing motion, in conjunction with an image sensor for use in reconstructing a fingerprint image, for use in navigation applications or other applications where accurate motion sensing is desired. The process begins at step 1302. In step 1304, an initial sample array of a fingerprint is sensed. In step 1304, a second sample array is sensed after a period of time, t=n. The arrays are converted into a digital representation of the array of fingerprint sensors, and a digital string of digital ones and zeros is used by a processor to determine the relative movement between the two samplings. In practice, a predetermined period of time can be selected, or it can alternatively be measured, where time is measured between the first and second samples. In either case, once the distance is determined between the two samples, assuming that movement has occurred, velocity can be calculated using the distance traveled divided by the time expended during such travel.

Continuing, in step 1308, the two arrays are compared. In an initial alignment, referring briefly to FIG. 10, the arrays are compared side by side. If this comparison shows a high correlation, then it is indicative of no relative motion between the fingerprint and the motion sensor. In step 1310, a similarity score is generated, defining the amount of correlation between the two arrays. This may be in the form of a probability value, a percentage correlation value, or other mathematical value that can be used by the processor to determine the best similarity score among different comparisons. In step 1312, it is determine whether the shift is a last shift in a predetermined number of shifts. In practice, it is practical to shift at least the number of pixels in the array sensor, since both image arrays are sensed and sampled by the same sensor array. Again, similar to the process invention embodied in FIG. 12, the direction of the shifting may be done according to a predicted direction that a user would be expected to move the fingerprint surface across the sensor. If it is not known, or if the design calls for either direction, then flexibility can be accommodated by shifting the arrays in multiple directions until an alignment is reached that is within the threshold. If it is not the last shift, then the array is shifted in step 1314, and the process returns to step 1308, where the arrays are again compared, a new score is generated in step 1310, and it is again queried whether it is the last shift. If it is the last shift, then the highest similarity score is chosen in step 1316.

Then the distance is estimated in step 1318. Again, this can be done by simply counting the number of pixels in which the arrays were shifted, and multiplying this number by the distance between pixels, which can be estimated to be the distance between midpoints of two pixels. The distance can be accurately measured by sampling distances between individual pixels and groups of pixels in an array, but the exact method of measurement would depend on the application. Then, the velocity can be estimated in step 1320 by dividing the distance traveled by the time expended during the travel. The process ends in step 1322 where a velocity value can be generated.

Figure 14:
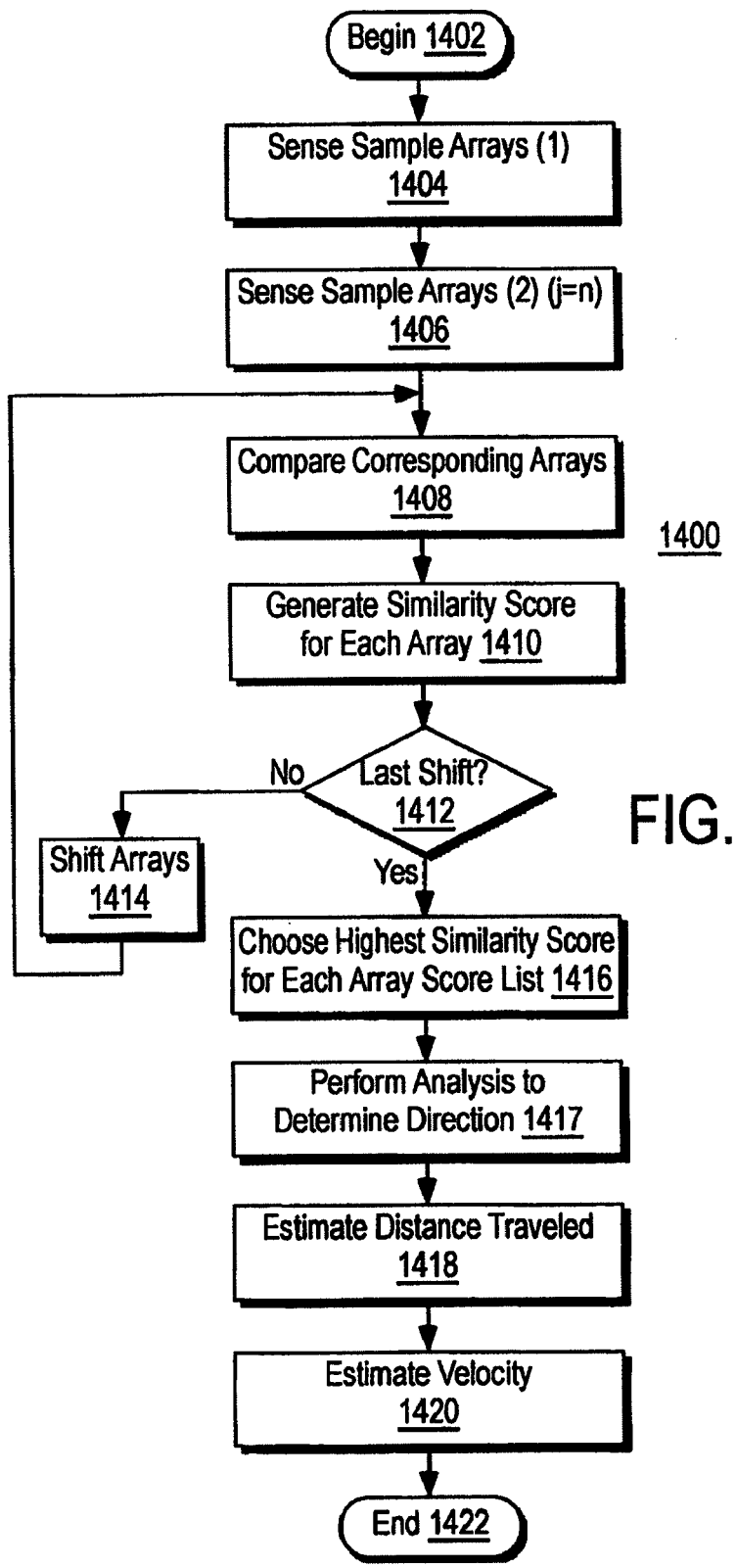
FIG. 14 is a flow diagram of method configured according to the invention.

Referring to FIG. 14, a flow chart of another embodiment of a navigation sensor operation is illustrated, where multiple sensors are used to produce navigation information from a navigation sensor. The process begins Referring to FIG. 14, another flow chart 1400 is illustrated that shows one embodiment of a motion sensor process that can be used for simply detecting and sensing motion, in conjunction with an image sensor for use in reconstructing a fingerprint image, for use in navigation applications or other applications where accurate motion sensing is desired. The process begins at step 1402. In step 1404, initial sample arrays of a fingerprint are sensed. In step 1404, a second set of sample arrays are sensed after a period of time, t=n. The arrays are converted into a digital representation of the array of fingerprint sensors, and a digital string of digital ones and zeros is used by a processor to determine the relative movement between the each of the two samplings from each sensor. In practice, a predetermined period of time can be selected, or it can alternatively be measured, where time is measured between the first and second samples. In either case, once the distance is determined between the two samples, assuming that movement has occurred, velocity can be calculated using the distance traveled divided by the time expended during such travel, and direction can be determined using vector analysis of the several vectors' motion information.

Continuing, in step 1408, the two arrays are compared for each sensor. In an initial alignment, referring briefly to FIG. 10, the digital representation of the arrays of features are compared side by side for each sensor array. If this initial comparison shows a high correlation, then it is indicative of no relative motion between the fingerprint and the motion sensor. In step 1410, a similarity score is generated for each array, defining the amount of correlation between the two arrays. This may be in the form of a probability value, a percentage correlation value, or other mathematical value that can be used by the processor to determine the best similarity score among different comparisons. In step 1412, it is determine whether the shift is a last shift in a predetermined number of shifts. In practice, it is practical to shift at least the number of pixels in each of the array sensors, since both image arrays from each sensor is sensed and sampled by the same sensor array. Again, similar to the process invention embodied in FIG. 12, the direction of the shifting may be done according to a predicted direction that a user would be expected to move the fingerprint surface across the sensor. If it is not known, or if the design calls for either direction, then flexibility can be accommodated by shifting the arrays in multiple directions until an alignment is reached that is within the threshold. If it is not the last shift, then the array is shifted in step 1414, and the process returns to step 1408, where the arrays are again compared, a new score is generated in step 1410, and it is again queried whether it is the last shift. If it is the last shift, then the highest similarity score is chosen in step 1416. In step 1417, the predominant direction of motion is determined by selecting the array with the highest similarity score at its local maximum. The arrays adjacent to the array at the predominant motion axis are examined to determine if either their similarity scores exceeds the threshold for a secondary component axis (this threshold is lower than the threshold for the predominant axis).

Then the distance is estimated in step 1418. Again, this can be done by simply counting the number of pixels in which the arrays were shifted, and multiplying this number by the distance between pixels, which can be estimated to be the distance between midpoints of two pixels. The distance can be accurately measured by sampling distances between individual pixels and groups of pixels in an array, but the exact method of measurement would depend on the application.

If the similarity score for either of the adjacent arrays exceeds the threshold and this similarity score occurs at a distance less than the distance traveled on the predominant axis, then the principal axis of motion is assumed to lie between the predominant axis and this second axis. The angle of motion is then estimated by computing the ratio of distances along the predominant and secondary axes. The ratio of these distances is approximately equal to the ratio of the cosines of the angles between the actual axis of motion and the axes of the two sensor arrays.

The final estimated distance is computed by taking the distance measured on the predominant axis sensor and dividing it by the cosine of the difference between the estimated angle of motion and the angle of the sensor axis.

Then, the velocity can be estimated in step 1420 by dividing the distance traveled by the time expended during the travel. The process ends in step 1422 where a velocity value can be generated.

Figure 15:
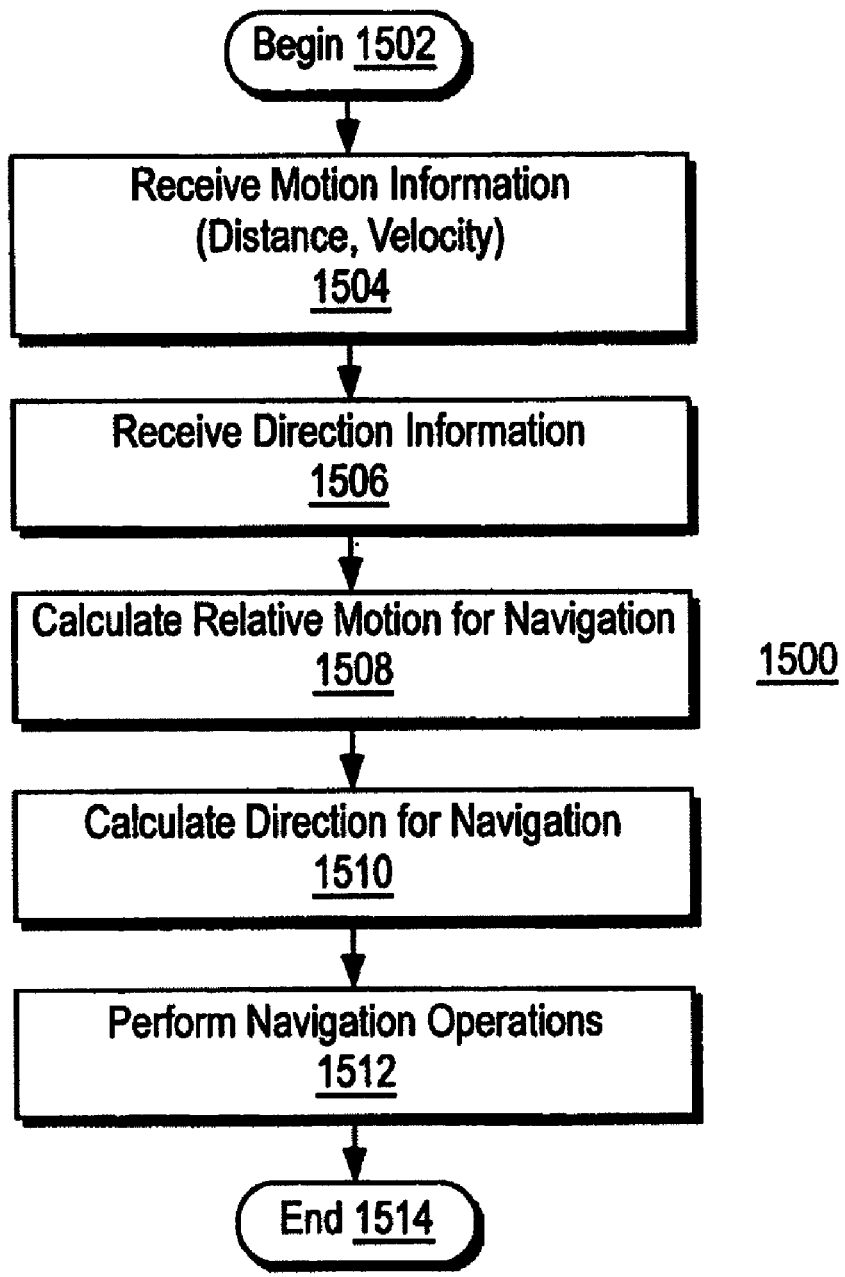
FIG. 15 is a flow diagram of method configured according to the invention.

Referring to FIG. 15, a flow chart 1500 of one embodiment of a navigation sensor operation is illustrated. The process begins at step 1502, and, in step 1504, motion information is received, such as distance, time and velocity information. In step 1506, direction information is received from the sensors. In step 1508, relative motion for navigation is calculated by a processor. In step 1510, direction information for navigation is calculated. And, in step 1512, navigation operations are performed. The process ends at step 1514.

Figure 16:
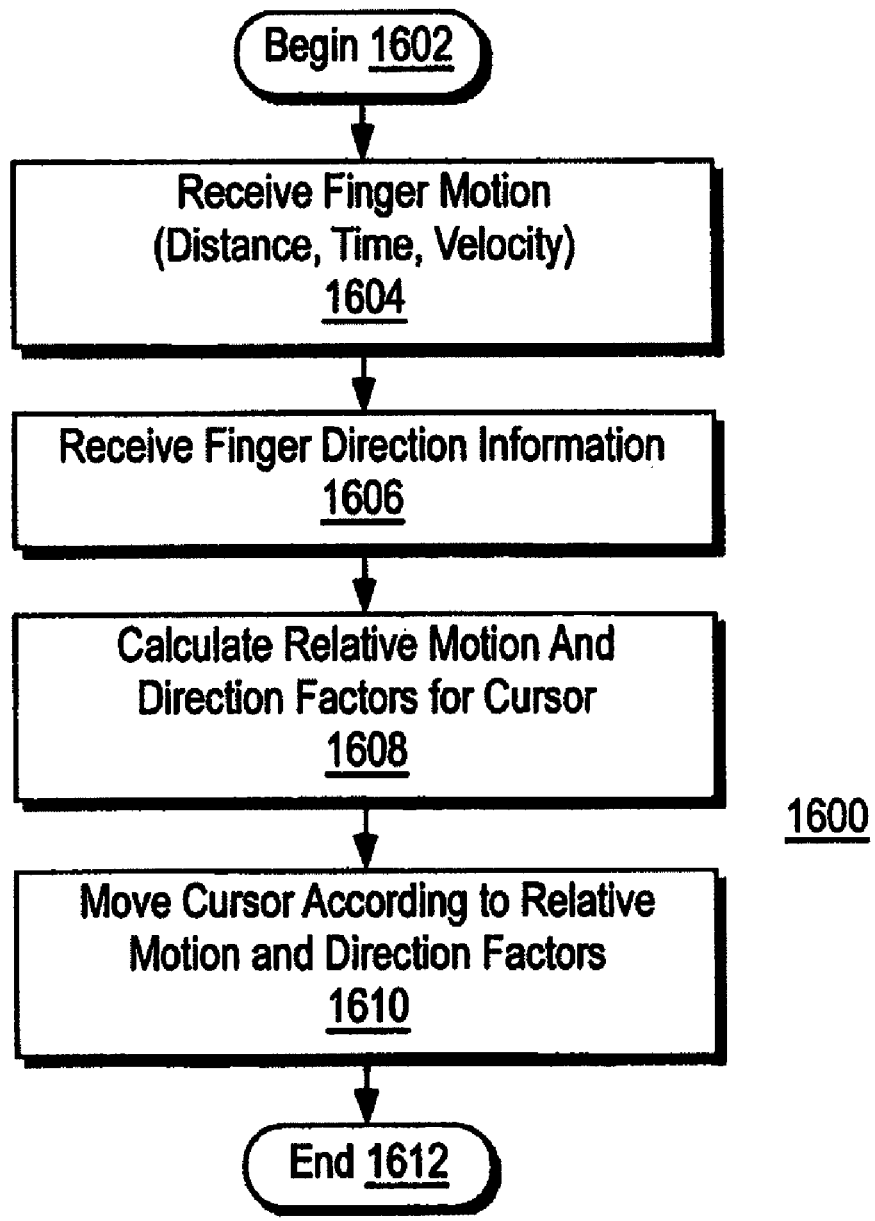
FIG. 16 is a flow diagram of method configured according to the invention.

Referring to FIG. 16, a flow chart of one embodiment of a navigation sensor operation, specifically the operation of a cursor on a monitor, is illustrated. The process begins in step 1602, and in 1604 finger motion information is received, such as distance, time and velocity. In step 1606, finger direction information is received. In step 1608, relative motion and direction factors are calculated for use in operating the cursor. In step 1610, the cursor is moved according to the relative motion and direction factors calculated in step 1610. The process ends in step 1612.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java™, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for enabling and controlling fingerprint sensors and fingerprint image data and motion data in conjunction with the operation of a electronic device where navigation and fingerprint verification processes are utilized. Although this embodiment is described and illustrated in the context of devices, systems and related methods of imaging fingerprints and navigation features for a portable device, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A fingerprint motion tracking apparatus, comprising:
   a first linear sensor array configured to sense features of a fingerprint along a first axis of finger motion and configured to repeatedly sense at least two line segments of fingerprint data, the first linear sensor array including a plurality of substantially contiguous sensing elements configured to capture segments of image data;
   a second linear sensor array configured to sense features of a fingerprint along a second axis of finger motion and configured to repeatedly sense at least two line segments of fingerprint data, the second linear sensor array including a plurality of substantially contiguous sensing elements configured to capture segments of image data, wherein the first linear sensor array is non-parallel with respect to the second linear sensor array;
   a buffer configured to receive and store image data from each of the first and the second linear sensor arrays; and
   a processing element configured to generate fingerprint motion data for use in navigation, wherein the processing element uses image data from the first linear sensor array to determine velocity along the first axis of finger motion, and uses image data from the second linear sensor array to determine velocity along the second axis of finger motion,
   wherein the first linear sensor array is configured to sense a first set of features of a fingerprint along the first axis of finger motion and to generate a first set of image data captured by a plurality of substantially contiguous pixels of the first linear sensor array, and is also configured to subsequently sense a second set of features of the fingerprint along the first axis of finger motion and to generate a second set of image data captured by the plurality of substantially contiguous pixels of the first linear sensor array, and
   wherein the processing element is configured to compare the first and the second sets of image data to determine the distance traveled by the fingerprint over a time interval, and
   wherein the distance and the time interval are used to calculate navigational data for navigating a cursor on a graphical user interface relative to the motion of a fingerprint across the first linear sensor array.

2. An apparatus according to claim 1, wherein the processing element is configured to generate motion data based on at least two sensed line segments of fingerprint data and navigation data based on relative motion of a fingerprint relative to an object being navigated.

3. An apparatus according to claim 2, wherein the object being navigated is a cursor on a graphical user interface.

4. An apparatus according to claim 1, wherein the fingerprint motion data further includes directional data.

5. A fingerprint motion tracking apparatus according to claim 1, further comprising a plurality of linear sensor arrays configured to sense features of a fingerprint and to generate directional image data captured by a plurality of substantially contiguous pixels, wherein the processing element is configured to produce navigation data using the fingerprint motion data to assemble contiguous image portions.

6. A method of tracking motion of a fingerprint with respect to a sensor for use in navigation operations, comprising the steps of:
- sensing at least two consecutive overlapping line segments of a fingerprint image along a first axis of motion of a fingerprint surface;
- sensing at least two consecutive overlapping line segments of the fingerprint image along a second axis of motion of the fingerprint surface;
- storing digital data corresponding to the at least two consecutive overlapping line segments of the fingerprint image for each of the first and the second axes of motion; and
- processing the digital data to generate fingerprint motion data and navigation data, wherein generating the fingerprint motion data comprises determining a velocity along each of the first and the second axes of motion
- comparing digital data corresponding to a first line segment with digital data corresponding to a second line segment, wherein the first line segment comprises a first series of fingerprint image features and the second line segment comprises a subsequently sensed series of fingerprint image features;
- determining the amount of shift between the first line segment and the second line segment to determine the distance traveled by the fingerprint across a sensor;
- estimating the distance traveled by the fingerprint surface with respect to the sensor surface by multiplying the amount of shift detected between subsequent images times the physical distance of the image pixels in the sensor;
- computing the velocity of the fingerprint surface with respect to the sensor surface by dividing the estimated distance by the time expended between the sensing of the first line segment and the sensing of the second line segment; and
- generating navigation data based on the distance and the velocity, for use in navigating an object relative to the fingerprint motion.

7. A method according to claim 6, further comprising the steps of:
- estimating the distance traveled by the fingerprint surface with respect to the sensor surface by multiplying the amount of shift detected between subsequent images times the physical distance between pixels in the sensor; and
- computing the velocity of the fingerprint surface with respect to the sensor surface by dividing the estimated distance by the time expended between the sensing of the first line segment and the sensing of the second line segment.

8. A method of tracking motion of a fingerprint with respect to a sensor for use in electronically navigating an object, comprising:
- collecting a time sequence of images values from each of a plurality of linear image sensor arrays;
- generating, by a processor in communication with the linear image sensor arrays, separate lists of similarity match scores for each linear image sensor array by comparing successively shifted versions of each image sample with a previous sample;
- determining, by the processor, which of the linear image sensor arrays produced the highest similarity match score to represent the principal axis of motion;
- determining, by the processor, an amount of shift of the linear sensor array that has the highest similarity match score;
- estimating the distance traveled along the principal axis by multiplying the number of pixels times the physical distance between pixels;
- computing the velocity of the fingerprint surface with respect to the sensor surface;
- computing the relative movement of a fingerprint with respect to an object being navigated;
- determining a linear sensor array adjacent to the principal axis that had the next highest similarity score to represent the secondary axis of motion;
- determining the pixel shift of the secondary axis of motion with the highest similarity match score; and
- if the pixel shift of the pixels on the secondary axis is less than the pixel shift of the pixels on the primary axis, computing the final velocity and direction as a vector sum of the pixels on the secondary axis and the pixels on the primary axis.

9. The method according to claim 8, further comprising the steps of:
- generating navigation information for navigating an object relative to fingerprint motion using the final velocity and direction computed.

10. A method according to claim 8, further comprising the steps of:
- determining a linear sensor array adjacent to the principal axis that had the next highest similarity score to represent a secondary axis of motion;
- determining the pixel shift of the secondary axis of motion with the highest similarity match score; and
- if the pixel shift of the pixels on the secondary axis of motion is less than the pixel shift of the pixels on the primary axis, computing the final velocity and direction as a vector sum of the pixels on the secondary axis and the pixels on the primary axis.

11. A fingerprint motion tracking system for producing navigation information, comprising:
- means for sensing features of a fingerprint along an axis of finger motion with a plurality of substantially contiguous sensing elements configured to capture a plurality of non-parallel segments of fingerprint image data;
- buffer means for receiving and storing image data from the means for sensing features of a fingerprint;
- means for generating by a processor in communication with a sensor array separate lists of similarity match scores for each sensing element comparing successively shifted versions image samples with a previous sample;
- means for determining which sensing element produced the highest similarity match score to represent a principal axis of motion;
- means for determining an amount of shift of the sensing element that has the highest similarity match score;
- means for estimating the distance traveled along the principal axis by multiplying the number of pixels times the physical distance between pixels;
- means for computing the velocity of the fingerprint surface with respect to a sensing element;

means for computing the relative movement of a fingerprint with respect to an object being navigated;

means for determining which sensor array adjacent to a principal axis that had the next highest similarity score to represent the secondary axis of motion;

means for determining an amount of shift of the secondary axis with the highest similarity match score, wherein, if the pixel shift of the pixels on the secondary axis is less than the pixel shift of the pixels on the primary axis, the final velocity and direction is computed as the vector sum of the pixels on the secondary axis and the pixels on the primary axis; and processing means for generating navigation data.

12. A system according to claim 11, further comprising means for producing navigation data using motion and direction data to assemble contiguous image portions.

13. A system according to claim 12, further comprising:

means for generating navigation information for navigating an object relative to fingerprint motion using the final velocity and direction computed.

14. A system according to claim 12, further comprising:

means for determining which sensor array adjacent to a principal axis that had the next highest similarity score to represent the secondary axis of motion; and means for determining the pixel shift of the secondary axis with the highest similarity match score;

wherein, if the pixel shift of the pixels on the secondary axis is less than the pixel shift of the pixels on the primary axis, computing the final velocity and direction as the vector sum of the pixels on the secondary axis and the pixels on the primary axis.

* * * * *